US008874129B2

(12) United States Patent
Forutanpour et al.

(10) Patent No.: US 8,874,129 B2
(45) Date of Patent: Oct. 28, 2014

(54) PRE-FETCHING INFORMATION BASED ON GESTURE AND/OR LOCATION

(75) Inventors: Babak Forutanpour, San Diego, CA (US); Brian Momeyer, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 943 days.

(21) Appl. No.: 12/813,347

(22) Filed: Jun. 10, 2010

(65) Prior Publication Data

US 2011/0306304 A1 Dec. 15, 2011

(51) Int. Cl.
| | | |
|---|---|---|
| *H04W 24/00* | (2009.01) | |
| *G06F 3/0488* | (2013.01) | |
| *H04W 4/00* | (2009.01) | |
| *H04M 1/725* | (2006.01) | |
| *H04W 4/02* | (2009.01) | |
| *H04L 29/08* | (2006.01) | |

(52) U.S. Cl.
CPC ............... *H04W 4/02* (2013.01); *H04W 4/027* (2013.01); *G06F 3/04883* (2013.01); *H04W 4/021* (2013.01); *H04M 2250/12* (2013.01); *H04W 4/001* (2013.01); *G06F 2200/1637* (2013.01); *H04M 1/72572* (2013.01); *H04L 67/02* (2013.01); *H04M 1/72569* (2013.01)
USPC .................................... 455/456.1; 455/67.11

(58) Field of Classification Search
USPC ......... 455/456.1, 432.1, 456.6; 709/203, 219, 709/217, 232; 711/137, 118; 707/999.002, 707/999.01; 710/309, 314; 382/305
See application file for complete search history.

(56) References Cited

U.S. PATENT DOCUMENTS

| | | | | |
|---|---|---|---|---|
| 6,385,641 | B1 * | 5/2002 | Jiang et al. ..................... | 709/203 |
| 6,553,461 | B1 * | 4/2003 | Gupta et al. .................. | 711/137 |
| 6,993,591 | B1 * | 1/2006 | Klemm ......................... | 709/232 |

(Continued)

FOREIGN PATENT DOCUMENTS

| | | |
|---|---|---|
| EP | 1615109 A2 | 1/2006 |
| EP | 1993270 A1 | 11/2008 |

(Continued)

OTHER PUBLICATIONS

Toward More Sensitive Mobile Phones, Ken Hinckley and Eric Horvitz, Microsoft Research, One Microsoft Way, Redmond, WA 98052, Nov. 11-14, 2001.

(Continued)

*Primary Examiner* — April G Gonzales
(74) *Attorney, Agent, or Firm* — Jennifer M. Pascua

(57) ABSTRACT

Example methods, apparatuses, and articles of manufacture are disclosed that may be utilized to pre-fetch and/or obtain information for use with mobile devices based, at least in part, on a gesture of a user and/or location of a mobile device. By way of example, a method may include detecting an arrival of a mobile device at a location; and pre-fetching, in response to the detection of the arrival, information in connection with executing one or more applications and/or functions on the mobile device. In certain implementations, a method may include processing signals received from at least one sensor at a mobile device; inferring, in response to the processing the signals, a likelihood of a user executing one or more applications and/or functions on the mobile device; and pre-fetching information in connection with the executing applications and/or functions on the mobile device based, at least in part, on the likelihood.

63 Claims, 6 Drawing Sheets

(56) References Cited

U.S. PATENT DOCUMENTS

| | | | |
|---|---|---|---|
| 7,076,255 B2 | 7/2006 | Parupudi et al. | |
| 7,107,384 B1 * | 9/2006 | Chen et al. | 710/309 |
| 7,263,368 B2 * | 8/2007 | Knauerhase et al. | 455/456.1 |
| 7,941,609 B2 * | 5/2011 | Almog | 711/137 |
| 2002/0198003 A1 | 12/2002 | Klapman | |
| 2005/0222801 A1 | 10/2005 | Wulff et al. | |
| 2006/0156209 A1 | 7/2006 | Matsuura et al. | |
| 2006/0250226 A1 | 11/2006 | Vogel et al. | |
| 2009/0132197 A1 | 5/2009 | Rubin et al. | |
| 2009/0225026 A1 | 9/2009 | Sheba | |
| 2009/0262078 A1 | 10/2009 | Pizzi | |

FOREIGN PATENT DOCUMENTS

| | | |
|---|---|---|
| EP | 2144139 A1 | 1/2010 |
| GB | 2374766 A | 10/2002 |
| JP | 2003008734 A | 1/2003 |
| JP | 2003204572 A | 7/2003 |
| JP | 2004102928 A | 4/2004 |
| JP | 2004229219 A | 8/2004 |
| JP | 3669702 B2 | 7/2005 |
| JP | 2005250853 A | 9/2005 |
| JP | 2006040271 A | 2/2006 |
| JP | 2006094485 A | 4/2006 |
| JP | 2006516012 A | 6/2006 |
| JP | 2009518946 A | 5/2009 |
| JP | 2009294000 A | 12/2009 |
| JP | 2010507870 A | 3/2010 |
| JP | 2010081319 A | 4/2010 |
| WO | 02088853 A1 | 11/2002 |
| WO | 2007067219 A1 | 6/2007 |
| WO | WO-2008051472 A1 | 5/2008 |
| WO | 2009029945 A2 | 3/2009 |
| WO | 2009156978 A1 | 12/2009 |

OTHER PUBLICATIONS

International Search Report and Written Opinion—PCT/US2011/040093—ISA/EPO—Nov. 28, 2011

* cited by examiner

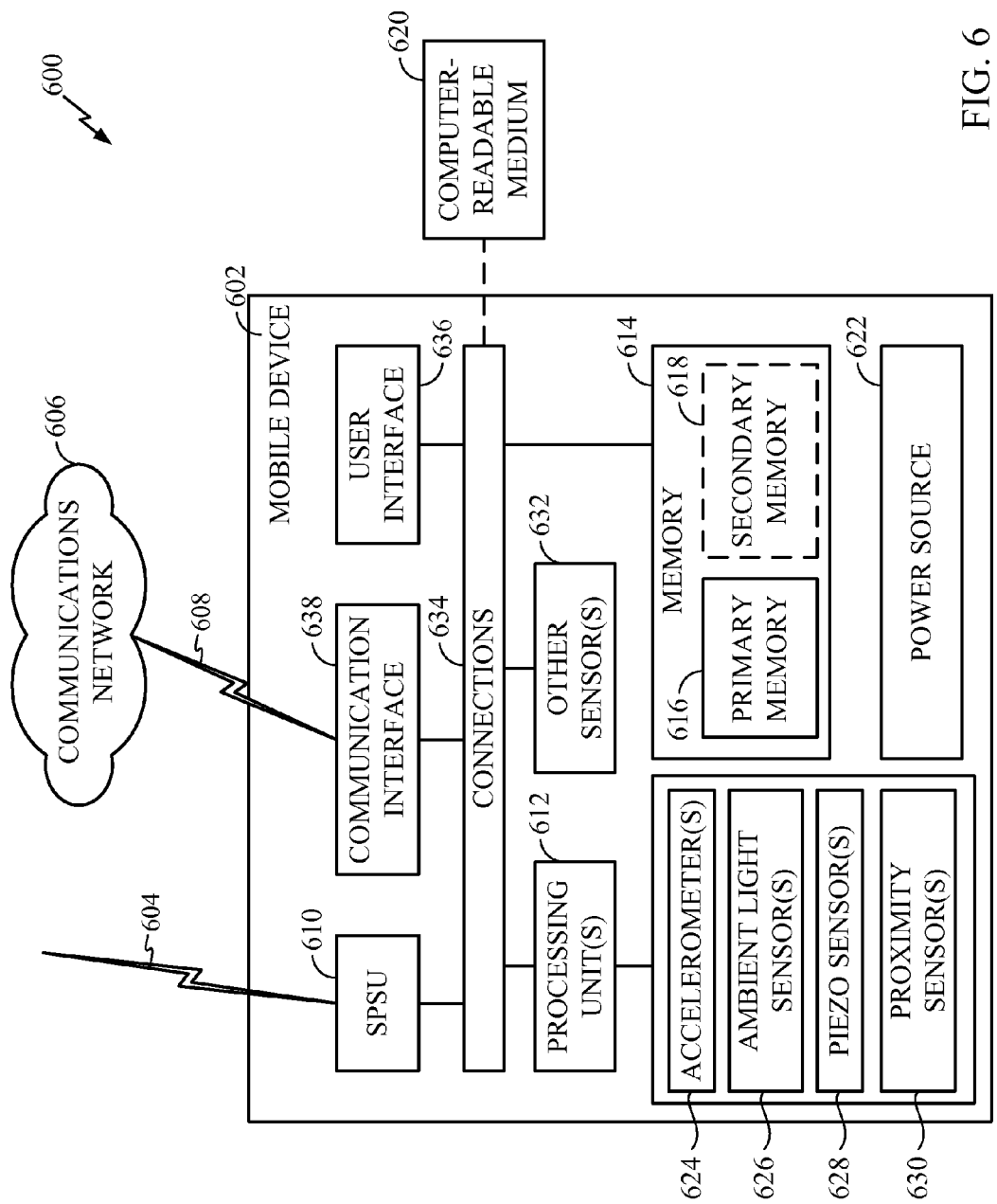

PRE-FETCHING INFORMATION BASED ON GESTURE AND/OR LOCATION

BACKGROUND

1. Field

The present disclosure relates generally to mobile communication devices and, more particularly, to pre-fetching information for use in and/or with mobile communication devices.

2. Information

As geographic barriers to personal travel decrease and society becomes more mobile, the need to access information regardless of place and/or time, as well as to stay connected while on the move becomes increasingly important. The use of the Internet, navigation or positioning systems, e-mail, telecommunications, electronically-enabled trade or e-commerce, etc., has become widespread, and mobile or wireless communication devices may already play a significant role in allowing society to maintain its mobility. Continued advancements in information and communication technology help to contribute to a rapidly growing market for mobile communication devices, which have become ubiquitous and may already be viewed as "extensions of the hand" altering the manner in which society communicates, does business, and/or creates value.

Mobile communication devices, such as, for example, cellular and satellite telephones, laptop computers, personal digital assistants, tablet personal computers, electronic book readers, or the like, are fast becoming one of the most prevalent technologies in the digital information age. Such mobile devices may enable users to request and/or access information, services, and/or functions anytime anyplace through one or more applications that may be hosted on computing platforms associated with these devices. For example, in addition to telephonic voice services, such applications may include web-based or browser-deployed applications (e.g., navigational, geo-processing or mapping, social networking, electronic communications, web searching, etc.), as well as applications that may reside locally on mobile communication devices (e.g., games, contacts organizers, appointment schedulers, photo editors, etc.).

Typically, although not necessarily, to launch such an application and/or to trigger a function, a user may need to browse or otherwise navigate through a selection menu, for example, by pressing on appropriate keys and/or buttons or, optionally or alternatively, by making a selection through icons, images, or other selectable visual indicators via a graphical user interface (e.g., via a touch screen, digital pen, etc.). Such a process may typically be accompanied by an undesirable delay between a user-initiated input or selection event (e.g., pressing on buttons to launch an application, retrieve information or data from a network, dial a particular number, navigate or scroll through a contact list, etc.) and performance of the selected or specified action associated with a particular application.

Moreover, with the increased number of applications hosted on computing platforms of mobile communication devices comes the increased complexity of contextual user-device interactions (e.g., navigating through menus or pressing buttons in the context of making a call, launching an application, selecting a contact from a contact list, etc.), which in turn may further increase lag times that may ordinarily exist in mobile settings or environments involving multifunctional communication devices. For example, a user may simultaneously engage in many routine activities (e.g., drive a car, walk a dog, cross a busy street, hold a cup of coffee or newspaper, communicate with a friend or colleague, use e-mail or text messaging, etc.) and may wish that user-device interactions be minimally demanding of user's input and/or attention. Accordingly, it may be desirable for a mobile device to sense, predict, or otherwise anticipate, for example, when and/or how a user will request and/or access information of interest so as to "shave seconds" or eliminate extra efforts or steps (e.g., scrolling through a contact list, manually dialing a number or accessing a web page, etc.) in such contextual user-device interactions. Accordingly, it may be advantageous to develop one or more methods, systems, and/or apparatuses that may implement intelligent, effective, and/or efficient sensing techniques to pre-fetch or obtain information (e.g., for use by pre-loaded and/or launched applications, triggered functions, etc.) to mobile communication devices quickly and/or with minimal attentional demands by users for better and/or more satisfying user experience.

BRIEF DESCRIPTION OF THE DRAWINGS

Non-limiting and non-exhaustive aspects are described with reference to the following figures, wherein like reference numerals refer to like parts throughout the various figures unless otherwise specified.

FIGS. 2A through 3 are illustrative representations of a user display according to an implementation.

FIG. 6 is a schematic diagram illustrating an example computing environment associated with one or more mobile devices supportive of the processes of FIGS. 4 and 5.

SUMMARY

Figure 1:
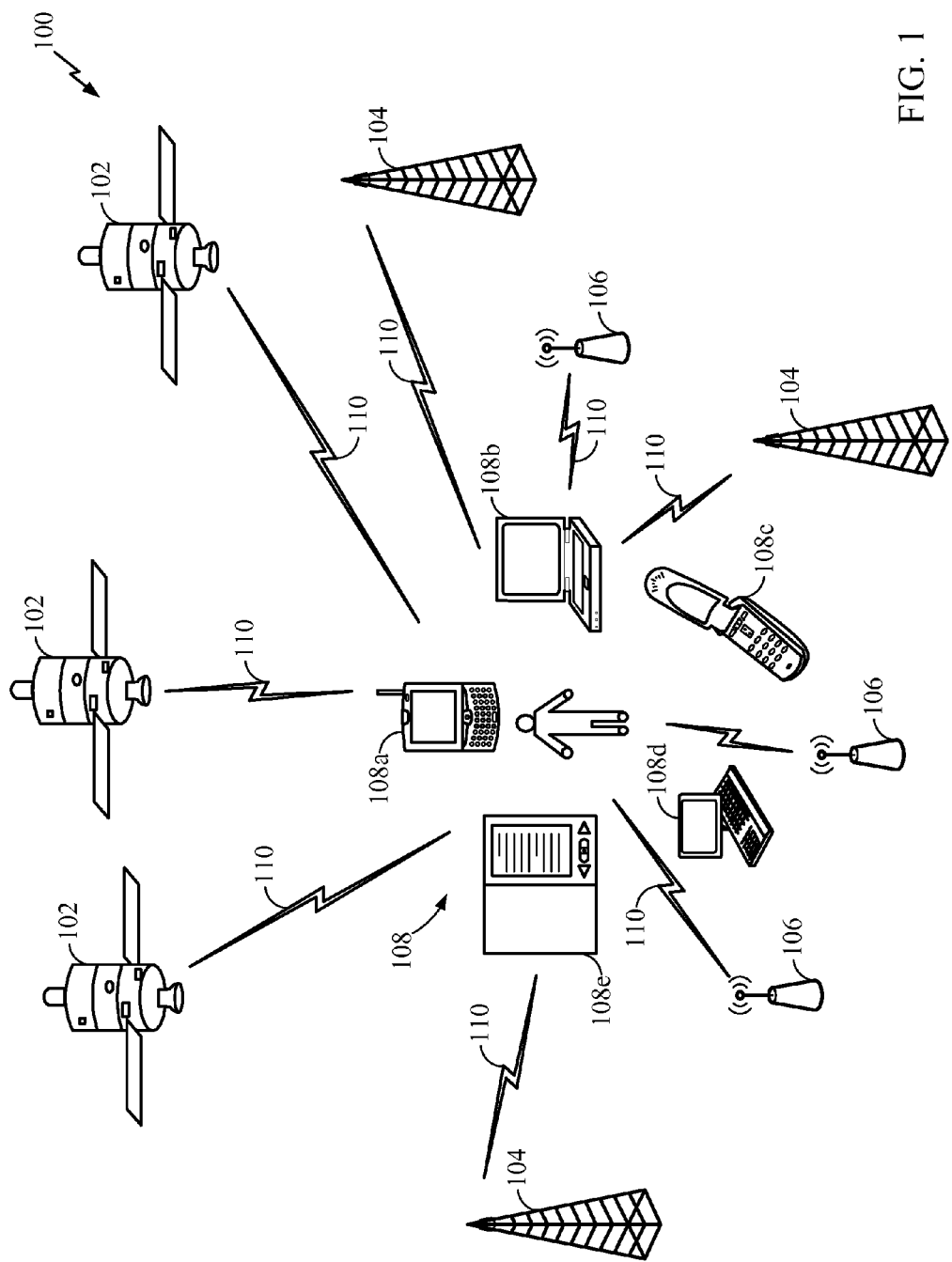
FIG. 1 is a schematic diagram illustrating certain features associated with an example signaling environment according to an implementation.

Example implementations relating to pre-fetching and/or obtaining information based, at least in part, on a gesture of a user and/or location of a mobile device are disclosed. In one implementation, a method may comprise electronically detecting an arrival of a mobile device at a location; and pre-fetching, in response to the detection of the arrival, information in connection with executing one or more applications and/or functions on the mobile device. A detection of an arrival of a mobile device at a location may include electronically determining an estimate of a location of a mobile device; and electronically detecting that the estimated location is within a pre-defined geo-fenced area. It should be understood, however, that this is merely a particular example of methods disclosed and discussed throughout, and that claimed subject matter is not limited to this particular example.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Some example methods, apparatuses, and articles of manufacture are disclosed herein that may be utilized to pre-fetch and/or obtain information for use by or in connection with executing one or more applications and/or functions hosted on or otherwise associated with mobile communication devices based, at least in part, on a gesture of a user and/or location of a mobile device. As referred to herein, "pre-fetching," "pre-loading," and/or the plural form of such terms may be used interchangeably and may relate to any technique or process of retrieving any type of suitable information (e.g., a computer-readable code, instructions, program data or information, digitized voice data or information, e-mail or text messaging data or information, signal information, etc.) from one partial or substantial memory source typically, although not necessarily, of lower memory hierarchy (e.g., a lower-speed main memory, removable disc memory, etc.) and bringing or transmitting (e.g., internally, wirelessly, etc.) such information into another partial or substantial memory source typically, although not necessarily, of higher memory hierarchy (e.g., a higher-speed cache, random access memory, etc.) before such information is needed and/or utilized by an application and/or function. As will be described in greater detail below, in certain example implementations, a computer-readable code and/or instructions may be pre-stored locally (e.g., in main memory, etc.) of a mobile device and/or may be pre-fetched (e.g., via a browser-deployed application, etc.) or pre-loaded, for example, into a local cache (e.g., read off a flash memory, loaded into a random access memory (RAM), running in the background on a mobile device, etc.) using an interrupt vector, terminate but stay resident (TSR) program, and/or the like.

As used herein, "mobile device," "mobile communication device," "wireless device," and/or the plural form of such terms may be used interchangeably and may refer to any kind of special purpose computing platform and/or device that may communicate through wireless transmission and/or receipt of information over suitable communication networks according to one or more communication protocols and that may from time to time have a position or location that changes. As a way of illustration, special purpose mobile communication devices, which may herein be called simply mobile devices, may include, for example, laptop computers, notepads, personal digital assistants (PDA), personal entertainment systems, cellular telephones, satellite telephones, smart telephones, e-book readers, tablet personal computers (PC), personal audio and/or video devices, point-of-sale devices, navigational units, and/or other like communication devices. In some implementations, mobile devices may include one or more types of memory operatively coupled to a processor adapted to perform one or more functions that may be controlled by such a computer-readable code and/or instructions. It should be appreciated, however, that these are merely illustrative examples relating to mobile devices that may be utilized for pre-fetching and/or obtaining information in mobile settings or environments, and that claimed subject matter is not limited in this regard.

As previously mentioned, a location or position of a mobile device may change from time to time. A "location," "position," as referred to herein and/or the plural form of such terms may be used interchangeably and may relate to any type of information that may be associated with a whereabouts of an object or thing according to a point of reference. For example, a location may be represented as geographic coordinates, such as latitude and longitude. Optionally or alternatively, a location or position may also include references to an altitude, time, direction, distance, and/or may also be represented as a street address, governmental jurisdiction, postal zip code, and/or the like. Of course, these are merely examples relating to a representation of a location or position, and claimed subject matter is not limited in these respects.

As discussed below, a variety of sensing techniques may be available to facilitate or support pre-fetching and/or obtaining information for use by or in connection with executing one or more applications and/or functions hosted on or otherwise associated with mobile devices. In some implementations, such techniques may, for example, allow for immediate or otherwise more efficient access to such an application (e.g., a messaging service application, outbound call dialer, location tracker, browser-deployed application for a web site or page, etc.) and/or function (e.g., a contact list, business organizer, games, etc.) based, at least in part, on detecting, inferring, and/or predicting what application and/or function a user will or may request (e.g., a likelihood) and/or a user's request for such an application and/or function. These applications and/or functions may be pre-fetched or pre-loaded into a mobile device (e.g., in a cache, RAM, etc.), for example, in response to signals from one or more sensors integrated into (e.g., built-in, etc.) or otherwise supported by (e.g., stand-alone, etc.) the mobile device before such applications and/or functions are requested and/or accessed by a user. In one particular implementation, detection of a condition may initiate pre-fetching information through accessing, for example, a universal resource locator (URL) or like resource indicator or identifier associated with the World Wide Web (or simply the Web) through a suitable wireless communication network.

Accordingly, such techniques may "shave seconds" from or reduce response times associated with user-device interactions (e.g., speed up application launch times, boot functions, etc.) by utilizing information available from cache, volatile or non-volatile memory, etc. of a mobile device, for example, instead of accessing or requesting such information from one or more remote servers (e.g., an information server, location server, etc.), main memory, etc. In certain example implementations, in addition to "shaving seconds" from user-device interactions, one or more sensing techniques may reduce power consumption of mobile devices having limited power resources (e.g., battery-operated, etc.) and may positively impact operating lifetime of such devices. For example, utility and/or overall efficiency of a mobile device may be increased via selective and/or incremental or intelligent employment of associated sensors, location-aware units, etc., as will also be seen.

According to an implementation, sensing techniques may comprise processing of signals representative of a geographic location to detect or infer one or more conditions or triggering events under which a mobile device may, for example, power up and/or take or perform a particular action without a contextual user-device interaction and/or user-initiated input or selection event (e.g., autonomously, automatically, with limited attentional demands, etc.). As will be described in greater detail below, a geographic location may include any type of a bounded area of interest meaningful to a user (e.g., of a mobile device) having a physical, virtual, etc. boundary line that may or may not correspond to and/or overlap with a physical location and/or structure (e.g., a house, room, cubicle, fenced and/or covered patio or back yard, etc.). In some example implementations, a coverage area of such a geographic location may be configured (e.g., by a user, etc.) to surround a particular indoor location, for example, partially or substantially tracking a building floor plan. In such a case, a service or coverage area (e.g., of a suitable location-aware, location-tracking, geo-mapping, geo-tagging service, etc.) associated with such a geographic location may be confined to indoor settings, though claimed subject matter is not so limited. As previously mentioned, a particular action of a mobile device may include, for example, launching an application and/or function, such as an e-mail or text messaging application, web-based application, bringing up on a display a contact list or menu, dialing a certain number, sending an electronic message, etc.

In certain example implementations, a mobile device may obtain or receive estimates of its geographic location using any one of several location-tracking and/or location-aware techniques, such as processing of signals from a satellite positioning system (SPS), advanced forward link trilateration (A-FLT), enhanced observed time difference (E-OTD), assisted global positioning system (A-GPS), communications with a location server through a wireless communications network (e.g., via Wi-Fi nodes, access points, directional antennas, femtocells, etc.), and/or other like techniques. Of course, these are merely examples related to location-aware and/or location-tracking techniques that may be implemented in connection with a mobile device, and claimed subject matter is not so limited. As will be seen, a mobile device may include or otherwise be supported by an SPS receiver, dedicated or otherwise, to facilitate and/or support such location-tracking and/or location-aware techniques. Certain features of such techniques will be described in greater detail below with reference to FIGS. 1, 2A, and 2B. In some implementations, such an SPS receiver may operate in full-power or full observability mode so as to implement active position or location tracking of a mobile device. Optionally or alternatively, such a receiver may be turned on or powered up periodically or at pre-defined and/or select times, for example, to reduce overall power consumption and increase utility of a mobile device, though claimed subject matter is not so limited.

As discussed below, a mobile device may detect a condition that initiates a particular action without a contextual user-device interaction and/or user-initiated input or selection event, for example, by employing a geo-fence for use with a suitable location-aware or location-tracking service. As the term used herein, a "geo-fence" may refer to a virtual boundary on a geographic surface or area that may surround a center point, such as, for example, a geo-point or geo-area centroid so that upon entering, exiting, and/or being present in, or within a certain distance from, such an area a particular action by a mobile device may be initiated. As will be seen, a user may define or establish a desired placement of such a geo-fence via a suitable geo-mapping and/or geo-tagging service application (e.g., Google™ Maps, Yahoo!® Maps, Bing™ Maps, etc.) that may, for example, be browser-deployed or otherwise supported by a user interface associated with a mobile device. In one particular implementation, a user may establish such a geo-fence by manually drawing a boundary line over a geographic area of interest on a digital map (e.g., with a digital pen, mouse, fingertip, etc.) in a display of a mobile device. In certain example implementations, a user may input or enter several coordinates (e.g., into a mobile device, etc.), and an application may define an area of interest by digitally connecting the points representative of such entered coordinates to define a bounded area representative of a geo-fence.

In some implementations, a user may establish a geo-fence by inputting coordinates (e.g., into a mobile device, etc.) of a center point and specifying a length of a radius or radii, for example, to define a circle-shaped or oval-shaped geo-fence, if desired. In certain implementations, a user may select a pre-configured (e.g., by a service provider, device manufacturer, marketer, etc.) boundary of a suitable size and/or shape, for example, to define a polygon-shaped geo-fence associated with a particular area of interest, though claimed subject matter is not so limited. Optionally or alternatively, a user may choose to edit a geo-fence created by an application, for example, to improve or otherwise tailor a virtual boundary to adhere to a particular physical location or area of interest. As will be seen, certain "geo-fenced" areas may be defined (e.g., by a user, etc.) as a house, carport, driveway, backyard, train platform, airport, work office, etc., just to name a few examples. Optionally or alternatively, a geo-fence may be defined so as to correspond to a particular type of a geographic location associated with indoor settings or environments (e.g., a building, house, room, cubicle, etc.), as will also be seen.

As illustrated in the example implementations of the present disclosure, one or more conditions for initiating a performance of a particular action of a mobile device may be detected in response to signals received from one or more sensors capable of transforming or converting physical phenomena into analog and/or digital electrical signals. Such sensors may include, for example, inertial sensors (e.g., accelerometers, gyroscopes, compasses, magnetometers, gravitometers, etc.), ambient environment sensors (e.g., ambient light detectors, radio frequency (RF) sensors, proximity sensors, piezo sensors, capacitance and/or resistance-based touch sensors, vibrational sensors, thermometers, etc.), or other sensors adapted to measure various states of a mobile device. Signals from such one or more sensors may be processed and/or measured by and/or at a mobile device, for example, and a particular condition may be detected, at least in part, from such one or more sensor-based and/or sensor-supported measurements. For example, in some implementations, a condition for initiating a particular action by a mobile device may be detected in response to signal measurements meeting or exceeding one or more pre-configured or pre-determined threshold values and/or parameters (e.g., acceleration, deceleration, velocity, tilt, rotation, etc.). It should be noted that one or more threshold values may be configured by a user, service provider, device manufacturer, etc., although claimed subject matter is not so limited. Such threshold values and/or parameters may be utilized, for example, to infer or predict likelihood of a particular user-device interaction, such as likelihood that the mobile device is being removed from a pocket, purse, holder, etc. in a context of making a call, answering e-mails, etc, though claimed subject matter is not so limited.

In certain implementations, measurements from more than one sensor may be utilized to detect a condition under which a mobile device may take a particular action. In such a case, measurements from these sensors may be required to occur in correlation or otherwise be in an applicable relation with each other (e.g., follow a certain pattern, occur within a certain time window or interval of each other, etc.) in order for a mobile device to detect or infer such a condition. In one particular implementation, signals from an inertial sensor and from an ambient environment sensor may be partially or substantially correlated with a pre-determined signal pattern or signature indicating a substantial or significant likelihood that a mobile device is being removed from a pocket, holder, purse, etc. to be put into use. For example, such likelihood may be inferred in response to a signal pattern or signature that may comprise a first signal received from an accelerometer followed by a second signal received from an ambient light detector within a certain time window or interval, as will be discussed in greater detail below. In some implementations, likelihood that a mobile device is being put into use may be inferred, for example, based, at least in part, on a signal pattern or signature comprising a signal received from one or more capacitive proximity sensors followed by one or more signals from an accelerometer and/or an ambient light detector performing respective measurement activities, as will also be seen. It should be appreciated, however, that these are merely illustrative examples of signal patterns or signatures that may be utilized in certain example implementations, and claimed subject matter is not limited in this respect. Other patterns and/or signatures are possible and may include, for example, a sequence of acceleration peaks during a certain time window or interval. Optionally or alternatively, a mobile device may detect or infer a particular condition without such a correlation.

In some implementations, a mobile device may be maintained in a low-power and/or reduced functionality mode or state in which the device may still be able to obtain and/or process, for example, location information and/or signals from one or more associated sensors. As a way of illustration, in such a mode or state, a mobile device may be able to detect a particular condition and/or initiate a performance of a particular action without a contextual user-device interaction and/or user-initiated selection event responsive, for example, to a geo-fencing technique, signals correlation technique, etc., as described above.

In accordance with one aspect of the present disclosure, while detecting or inferring a condition of a mobile device, sensors may be deployed incrementally and/or intelligently so as to reduce power consumption, which may increase utility and/or overall efficiency of a mobile device. For example, a power state of a sensor or sensors in an idle or sleep-mode state may be changed in response to one or more signals received from a sensor or sensors in a low-power or low-observability state, as previously mentioned. As a way of illustration, an idle ambient light detector may be placed into a normal or operational (e.g., full-power, full-observability, etc.) mode or state in order to perform a measurement activity in response to signals received from a low-powered accelerometer detecting a motion. In some implementations, powered-up sensors may stay in normal or operational modes until their respective measurement activities are completed and/or a condition for initiating an action is detected or inferred. Upon completion of a measurement activity and/or detection of a certain condition, for example, an ambient light detector may be shut down or returned to a sleep or idle mode, while an accelerometer may be placed into a low-power or low-observability mode. It should be noted, however, that these are merely examples relating to power-managing techniques that may be utilized in relation to sensors integrated into or otherwise supported by a mobile device, and claimed subject matter is not limited in this respect.

With this in mind, example techniques are described herein that may be utilized for pre-fetching and/or obtaining information for use in and/or with a mobile device without requiring a user to continuously maintain a particular context of a user-device interaction typically associated with mobile settings or environments. As previously mentioned, such techniques may allow for immediate or otherwise more efficient access to one or more applications and/or functions and may be based, at least in part, on a gesture of a user and/or location of a mobile device. It should be appreciated, however, that techniques provided herein and claimed subject matter is not limited to these example implementations. For example, techniques provided herein may be implemented or otherwise adapted for use in a variety of mobile information processing environments, such as mobile databases, mobile social networking applications, mobile blogging, etc. In addition, any implementations and/or configurations described herein as "example" are described for purposes of illustrations and are not to be construed as preferred or desired over other implementations and/or configurations.

Attention is now drawn to FIG. 1, which is a schematic diagram illustrating certain features, functional or otherwise, associated with an example signaling environment 100 that may be communicatively enabled to facilitate or otherwise support pre-fetching and/or obtaining information based, at least in part, on a gesture of a user and/or location of a mobile device. It should be appreciated that environment 100 is described herein as a non-limiting example, and that pre-fetching and/or obtaining information may be implemented, partially or substantially, in the context of various communication networks or combination of networks. Such networks may include, for example, public networks (e.g., the Internet, the World Wide Web), private networks (e.g., intranets), local area networks (LAN), wide area networks (WAN), virtual private networks (VPN), and/or the like, though claimed subject matter is not limited to these examples. As previously mentioned, signaling environment 100 may, for example, be communicatively enabled using one or more special purpose computing platforms, information communication devices, information storage devices and/or databases, computer-readable codes and/or instructions, program data or information, digitized voice data or information, e-mail or text messaging data or information, signal information, specific applications and/or functions, various electrical and/or electronic circuitry or components, etc., as described herein with reference to particular example implementations.

As illustrated, signaling environment 100 may comprise a number of space vehicles (SVs) 102, base transceiver stations 104, ground-based transmitters 106, or other like communication and/or navigation systems that may be communicatively coupled to one or more mobile devices, indicated generally by arrow at 108, via one or more wireless communication channels or links 110 in accordance with one or more wireless communication protocols.

Base transceiver station 104 may comprise any wireless communication station typically installed at a fixed terrestrial or ground-based location and may be used to facilitate or otherwise support communication in a wireless communications system or network, such as, for example, a cellular network, Wi-Fi network, etc., although the scope of claimed subject matter is not limited in this respect. It should be appreciated that in certain example implementations base transceiver station 104 may comprise an access point, such as, for example, a wireless local area network (WLAN) access point. In some implementations, stations 104 may be implemented in the form of access point base stations or femtocells to facilitate or otherwise support communication with mobile device 108. As used in the context of the present disclosure, a "femtocell" may refer to a small cellular base station enabled to connect to a service provider's network, for example, via broadband, such as, for example, a Digital Subscriber Line (DSL) or cable. In one possible example, a femtocell may utilize or otherwise be compatible with various types of communication technology (e.g., Universal Mobile Telecommunications System (UTMS), Long Term Evolution (LTE), GSM, etc.). In certain implementations, a femtocell may comprise integrated WiFi (e.g., for round-trip time ranging, etc.), though such details are merely examples, and claimed subject matter is not so limited.

Although not shown, it should be noted that base transceiver station 104 may be communicatively coupled to one or more networks, such as, for example, a public switched telephone network (PSTN), a packet data serving node (PDSN), or the like, via one or more mobile switching centers (MSC). Such an MSC, for example, may provide connectivity or facilitate coordination between base transceiver stations 104, and may further manage or support the routing of information to and/or from mobile devices 108 served by one or more base transceiver stations 104, to one or more information and/or location servers (e.g., e-mail, text messaging, web sites, assisted location services, etc.).

As further illustrated in this example implementation, signaling environment 100 may include one or more ground-based transmitters 106 comprising a variety of like or different types of systems that may facilitate or otherwise support one or more location and/or velocity estimation techniques and/or processes. For example, transmitter 106 may comprise any one of a wide range of transmitter types for various types of networks that may be associated with one or more network providers or carriers. Typically, although not necessarily, transmitters 106 may be selected according to their respective signal frequency, band class, etc. associated with such networks. Of course, these are merely examples relating to various types of transmitters, and claimed subject matter is not limited in these respects.

As previously mentioned, mobile device 108 may comprise a special purpose computing platform and/or device enabled to operatively communicate using at least one wireless communications network through transmission and/or receipt of wireless signals, and may from time to time have a position or location that changes (e.g., physically carried, transported, moved, etc.). An example implementation of a mobile device offering particular features associated with and/or supported by signaling environment 100 will be described in greater detail below with reference to FIG. 6.

As a way of illustration, mobile device 108 may comprise any wireless communication and/or navigation device, such as a personal digital assistant (PDA) 108*a*, a laptop computer 108*b*, a cellular/satellite telephone 108*c*, a tablet personal computer (PC) 108*d*, an e-book reader 108*e*, just to name a few examples. It should be appreciated that even though only certain types and/or number of mobile devices 108 are illustrated in FIG. 1, any type and/or number of mobile devices 108 may be implemented to facilitate or otherwise support one or more techniques and/or processes associated with signaling environment 100. For example, in certain implementations, mobile device 108 may take the form of one or more integrated circuits, circuit boards, and/or the like that may be operatively enabled for use in another communication and/or navigation device.

As previously mentioned, mobile device 108 may obtain or receive estimates of its geographic location and/or velocity based, at least in part, on wireless signals transmitted from one or more SVs 102 associated with one or more satellite positioning systems (SPS). Such an SPS may comprise a variety of like or different types of Global Navigation Satellite Systems (GNSS) including, for example, the United States Global Positioning System (GPS), the Russian GLONASS system, the European Galileo system, as well as any system that may utilize satellites from a combination of satellite systems, or any satellite system developed in the future.

In certain example implementations, such a GNSS may comprise a number of SVs 102 associated with a particular SPS and one or more terrestrial positioning systems utilizing a number of ground-based transmitters 106 realized as, for example, pseudo-satellites or pseudolites. In this particular example, such pseudolites may communicate wireless signals that may be acquired by mobile device 108 in circumstances where such signals from SVs 102 might be insufficient (e.g., weak, fragmentary, etc.) or otherwise unavailable, such as in tunnels, mines, buildings, urban canyons, or other partially or substantially enclosed areas.

In some implementations, mobile device 108 may estimate its location and/or velocity utilizing one or more trilateration-based techniques, as previously mentioned. For example, such techniques may include Advanced Forward Link Trilateration (A-FLT) in CDMA, Enhanced Observed Time Difference (E-OTD) in GSM, Observed Time Difference of Arrival (OTDOA) in W-CDMA, etc. and may be based, for example, on measurements at mobile device 108 of the relative times of arrival of signals transmitted from base transceiver stations 104 and/or transmitters 106. In certain example implementations, assisted GPS (A-GPS) or other like assisted position estimation techniques (e.g., assisted local positioning, hybrid positioning, etc.) may be utilized with mobile device 108, for example, to facilitate, supplement, or otherwise support such trilateration-based techniques. It should be appreciated that various location and/or velocity estimation techniques are known in the art and need not be described here in greater detail. Of course, claimed subject matter is not limited to particular examples described in the context of the present application. Various other techniques and/or processes may be implemented to facilitate or otherwise support one or more estimates of location and/or velocity of mobile device 108.

Figure 2:
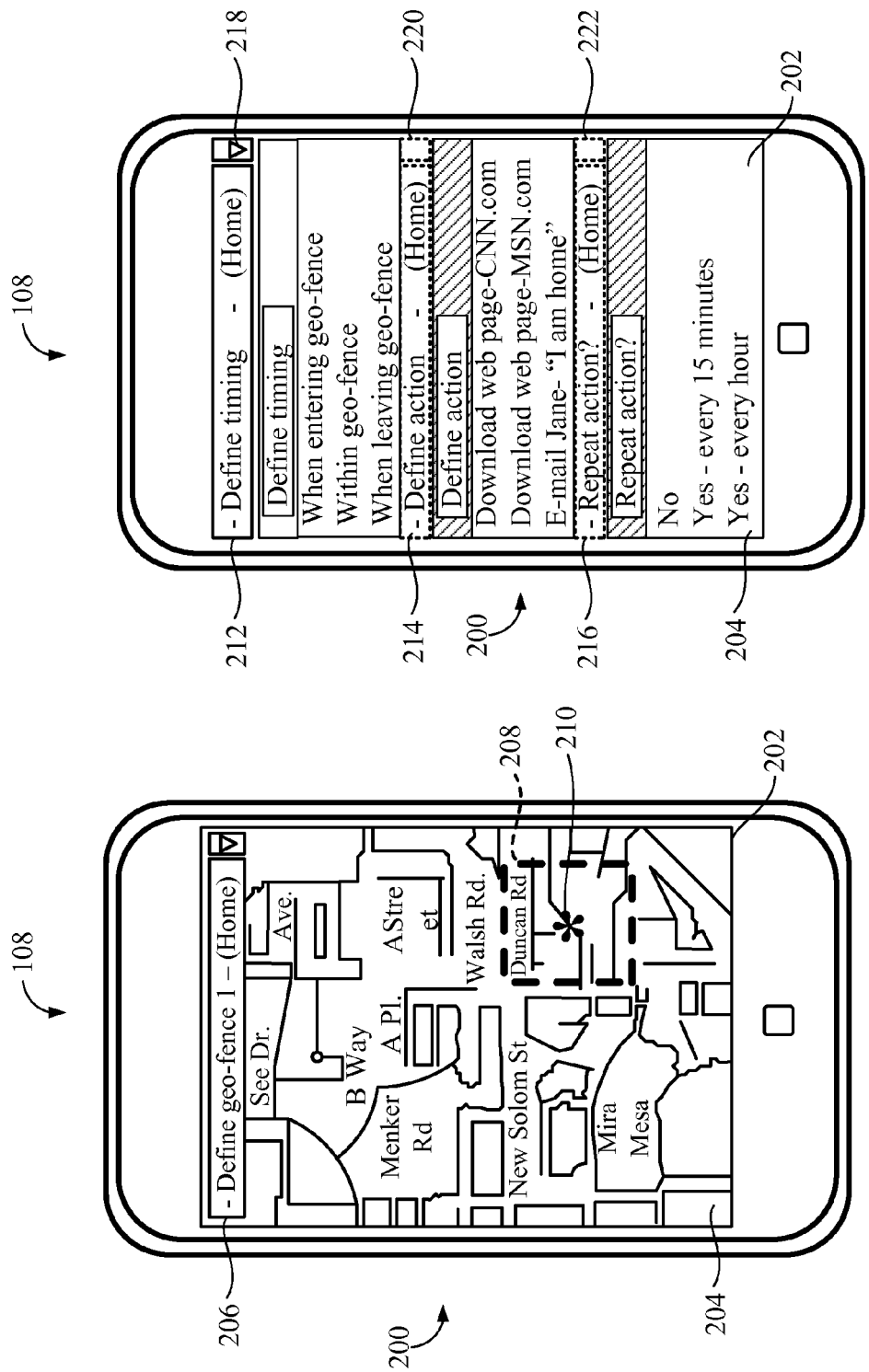

Turning now to FIGS. 2A and 2B, which illustrate certain functional features of mobile device 108 of FIG. 1 that may be implemented to facilitate or otherwise support an example geo-fencing technique associated with signaling environment 100. These figures may illustrate an example progression of defining or establishing a geo-fence and a particular action to be taken or performed by mobile device 108 in response to a triggering event(s) with respect to a geo-fence, though claimed subject matter is not limited to such an example progression, triggering event(s), and/or particular actions of mobile device 108, of course.

As illustrated, a user may define or establish, and/or edit a geo-fence, for example, via a user display 200 associated with mobile device 108, which is represented here by a location-aware smart telephone, as one example among many possible. Display 200 may comprise an application window 202 as a graphical user interface (GUI) for a computing application or platform to manage or otherwise manipulate visual content (e.g., browse through maps, navigate through menus, define actions, select visual indicators, etc.). As used herein, a "graphical user interface" (GUI) may refer to a program interface that utilizes displayed graphical information to allow a user to control and/or operate a special purpose computing platform associated with mobile device 108, for example, by a pointer and/or a pointing device. A pointer may refer to a cursor, arrow, or other symbol appearing on display 200 and may be moved or controlled with a pointing device to select objects, populate fields, input commands, etc. via a GUI of mobile device 108. A pointing device may refer to any object and/or device used to control a cursor and/or arrow, to select objects, to populate fields, or to input information such as commands and/or drop-down menu options, for example, via a GUI of the device. Such pointing devices may include, for example, a mouse, a trackball, a track pad, a track stick, a keyboard, a stylus, a digitizing tablet, a digital pen, a fingertip in combination with a touch screen, etc. A cursor may refer to a symbol or pointer where an input selection or actuation may be made with respect to a region in a GUI. Herein, terms such a "click" or "clicking" may refer to a selection process made by any pointing device, such as a mouse, for example, but use of such terms is not intended to be so limited. For example, a selection process may be made via a touch screen. In such a case, "clicking" may be replaced by "touching." However, these are merely examples of methods of selecting objects or inputting information, and claimed subject matter is not limited in scope in these respects.

As illustrated in FIG. 2A, to begin a process of defining or establishing a geo-fence, a user may operate mobile device 108 (e.g., via a touch screen of display 200, etc.), for example, to execute instructions for one or more resident or web-based geo-mapping and/or geo-tagging service applications to download or otherwise bring up a digital map 204 on application window 202. It should be appreciated that, although not shown, window 202 may include one or more toolbars, scroll bars, hyperlinks, images, icons and/or other selectable content providing an ergonomic, efficient and/or interactive user environment. At the beginning of such a process, a user may be presented with one or more user-selectable information fields, such as, for example, a drop-down information menu 206 from which a user may select a particular geo-fence from a listing of geo-fences for a geo-physical entity that may be pertinent to such a user (e.g., home, train station, work office, etc.), just to illustrate one possible implementation. A user may also define or establish a geo-fence, for example, by manually drawing a virtual boundary line, as indicated by dashed lines at 208, over an area of interest on map 204 with a digital pen, fingertip, stylus, etc., as previously mentioned. A user may associate a geo-fence with a particular geo-physical entity, for example, for purposes of efficiency, convenience, association, ease of browsing/navigating, etc. As used herein, a "geo-physical entity" may refer to one or more entities or objects identifiable via a map or similar type of visual information. As mentioned above, a geo-physical entity may include an airport, parking lot, work office, train station, highway, road, etc., just to name a few examples. Optionally or alternatively, a geo-fence may not be associated with a particular geo-physical entity. Illustrating a particular example, geo-fence 208 of FIG. 2A may comprise, for example, a polygon-shaped geo-fence having a geo-area centroid 210 and is associated with a geo-physical entity "Home," although claimed subject matter is not so limited. Here, a user may define geo-fence 208 such that a service or coverage area associated with such a geo-fence is confined to an indoor environment corresponding to the size and/or shape of a user's residence such as, for example, the inside area of a particular building, room(s), etc., just to illustrate one possible implementation. It should be appreciated that geo-fence 208 may be established or defined (e.g., by a user, etc.) so as to include any suitable outdoor entity or object of interest, as previously mentioned. Location of a geo-fence and/or other related information, such as map coordinates, addresses, etc. may be stored in memory of mobile device 108 and/or one or more remote servers associated with a geo-mapping and/or geo-tagging service provider, for example.

Continuing now with FIG. 2B, to facilitate a process of defining or establishing a geo-fence, application window 202 may display, for example, information fields, such as drop-down information menus 212, 214, and 216 to provide a user an opportunity to configure one or more parameters of interest with respect to geo-fence 208. In this example, a user may configure timing of a particular action, such as upon exiting, entering a geo-fence, etc., by clicking on a tab 218, for example, and selecting an option within drop-down menu 212. Similarly, a user may define a particular action to be taken by mobile device 108, such as accessing a web page, sending an e-mail, etc., by clicking on a corresponding tab 220, for example, of respective drop-down menu 214. In addition, via drop-down menu 216 resulting from a selection of a tab 222, for example, a user may specify whether a particular action to be repeated and at what time intervals, if desired. For example, a user may configure mobile device 108 to update or refresh the CNN.com web page every 15 minutes while such a user is within a perimeter of geo-fence 208 corresponding to the size and/or shape of a user's home, as one non-limiting illustration. Of course such actions, parameters, menus, etc. are merely illustrative examples, and claimed subject matter is not so limited.

In certain implementations, mobile device 108 may be configured to pre-fetch and/or obtain information, initiate a particular action, etc. in connection with geo-fence 208 at a selected or pre-defined time(s) of the day, day(s) of the week, month, year, and/or the like. As a way of illustration, having established geo-fence 208, a user may subsequently configure or define (via a GUI, touch screen, keypad buttons, suitable menus, etc.) particular time(s) of the day, week, month, etc. (e.g., 9 a.m. to 5 p.m., Monday through Friday, Jun. 1 through Jul. 31, 2010, etc.) for geo-fence 208 to be active and/or inactive, if desired. This feature may be advantageously employed where a user may not need to use particular information that otherwise would be pre-fetched and/or obtained by mobile device 108 upon a user's entering, exiting, etc. geo-fence 208. Examples may include a user's crossing a geo-fence, for example, associated with a train station (e.g., a geo-physical entity, etc.) late at night, on a weekend, during vacation, and/or at other times when a user would not need to interact with mobile device 108 (e.g., use particular applications, read e-mails or posts, make phone calls, send notifications, etc.), though claimed subject is not limited to these particular examples. It should be appreciated that any suitable time/clock tracking and/or management systems and/or services, synchronization techniques and/or standards (e.g., International Atomic Time, etc.), etc. may be utilized to facilitate or support one or more geo-fencing techniques in connection with mobile device 108, for example.

In addition, in some implementations, mobile device 108 may be configured to detect a rate of speed at which a user crosses geo-fence 208, for example, to be recognized as a condition that triggers pre-fetching and/or obtaining information, initiates a particular action, etc. As will be described in greater detail below, such a condition may be detected (e.g., in conjunction with a geo-fencing technique), for example, by a location-aware and/or tracking unit of mobile device 108 determining speed via processing wireless signals associated with an SPS or, optionally or alternatively, by an accelerometer performing a measurement activity. To illustrate, upon establishing geo-fence 208 associated with a user's home (e.g., a geo-physical entity "Home" of FIG. 2A), a user may subsequently define (via a GUI, touch screen, keypad buttons, suitable menus, etc.) one or more rates of speed (e.g., at crossing geo-fence 208), for example, as exceeding, falling below, or being between two speed thresholds (e.g., upper and lower) to be recognized as such a condition, just to illustrate one possible implementation. In this manner, rather than pre-fetching and/or obtaining information, etc. upon a user's crossing geo-fence 208 (e.g., each time, etc.), mobile device 108 may be able to apply a geo-fencing technique selectively, for example, by inferring and/or predicting from a user's speed (e.g., at crossing) whether a user is driving home (e.g., would want information to be pre-fetched, etc.) or just passing by (e.g. geo-area centroid 210, etc.) and/or through geo-fence 208. Accordingly, if a user's rate of speed is outside of a pre-defined threshold(s) when geo-fence 208 is crossed, a condition will not be detected and, thus, pre-fetching and/or obtaining information will not be triggered and/or a particular action will not be initiated, etc. by mobile device 108. Of course, such a description relating to particular conditions, thresholds, parameters, etc. in connection with applying a geo-fencing technique are merely examples, and claimed subject matter is not limited in this regard.

It should be appreciated that a user may configure, edit, or otherwise input any suitable parameter of interest with respect to a geo-fence, timing, actions, etc. using any suitable routines or operations that may be facilitated or otherwise supported, at least in part, by a special purpose computing platform associated with mobile device 108. Thus, mobile device 108 may comprise, for example, an editable combo-box or like combination of a drop-down menu and an input-line textbox, which may allow a user to input or enter a parameter of interest directly into an input line or to select a suitable parameter from a list of existing drop-down options. In addition, it should be noted that even though information fields or menus are illustrated in a foreground of map 204, such menus and/or other selectable content may be displayed on any portion of application window 202 or, optionally or alternatively, may not be displayed at all. In such an implementation, one or more parameters of interest may be configured, edited, etc. through an input device, for example, or through commands that are processed using voice-processing or related technology, as merely one possible example. Also, whether subsequent selectable information fields are originated and/or displayed progressively may depend, at least in part, on a user's previous selection of available options and/or an application, for example, though claimed subject matter is not limited to these example implementations.

In one particular implementation, trusted sources of a user (e.g., friends, family, etc.) may be allowed to establish a geo-fence over a geographic area of interest and/or associate such a geo-fence with mobile device 108, for example, to receive notifications (e.g., via e-mails, SMS, phone calls, etc.) if such a geo-fence is crossed. Here, such an implementation may provide benefits, for example, by allowing a family member (e.g., a wife, husband, etc.) to be notified in a variety of contexts, including but not limited to receiving e-mails indicating that a user entered a geo-fence associated with a particular grocery store (e.g., indoors, etc.), thus, prompting the family member to check home food inventory and communicate to the user (e.g., via an e-mail, phone call, etc.) a shopping list, if needed. Likewise, another benefit may include receiving alerts (e.g., phone calls, e-mails, etc.) if a child (e.g., having mobile device 108) exited a geo-fence associated with the inside area of a school building, playground, back yard, etc. Such trusted sources may be defined by a user, for example, using one or more suitable options, menus, etc. (e.g., via mobile device 108), browser-deployed applications associated with a geo-mapping and/or geo-tagging service provider, and/or the like, as possible examples. In addition, trusted sources may utilize any suitable solutions, Internet-based or otherwise (e.g., accessing a provider's web site, e-mailing or asking a user, etc.), to establish such a geo-fence and/or input any suitable parameter of interest. As one possible example, a family member may access a particular web site (e.g., via a mobile device, personal computer, etc.) associated with a service provider and may establish a desired geo-fence (e.g., in a manner similar to a process of FIGS. 2A-2B, etc.), associate it with a name of a user of mobile device 108, and input timing, actions, types of notifications to be sent or received, and/or other parameters of interest with respect to such a geo-fence. In certain example implementations, a user may, in whole or in part, disable or otherwise override in some manner an established (e.g., by trusted sources) geo-fence, for example, allowing certain people or groups of people (e.g., close friends and family, etc.) but not other people or groups of people (e.g., work colleagues, neighbors, etc.) to receive notifications, if a geo-fence is crossed. Of course, such a description of establishing a geo-fence and its benefits is merely an example, and claimed subject matter is not so limited.

In operative use, a special purpose computing platform associated with location-aware mobile device 108 of FIGS. 1, 2A, and/or 2B, for example, may receive or otherwise monitor one or more wireless signals associated with an SPS and may obtain or estimate its geographic location and/or proximity to geo-fence 208 and/or geo-area centroid 210. As previously mentioned, in some implementations, mobile device 108 may search for and/or monitor such wireless signals to facilitate or otherwise support active tracking of the device in a substantially continuous fashion. For example, such active tracking may include real time or near real time tracking, wherein mobile device 108 may receive estimates of its geographic location (e.g., updated coordinates, etc.), proximity to geo-fence 208 and/or geo-area centroid 210, speed, etc. once every 5 to 10 seconds, just to illustrate one possible implementation. As used herein, "real time" may refer to amount of timeliness of data or information which has been delayed by an amount of time attributable to electronic communication and automatic data processing. Of course, this is merely an example relating to active tracking of a mobile device, and the scope of claimed subject matter is not limited to this specific example. The term "monitor," as used herein with regard to wireless signals, may refer to a mobile device being capable to detect, receive, or otherwise acquire at least one wireless signal in such a manner so as to allow for a signal presence, strength, or other characteristic to be obtained and/or measured. Wireless signal detection techniques are known and need not be described here in greater detail.

In some implementations, while actively monitoring such wireless signals, location-aware mobile device 108 may, for example, detect a particular condition, such as crossing geo-fence 208, and may initiate a particular action without a contextual user-device interaction and/or user-initiated input or selection event, as previously mentioned. As a way of illustration, upon user's entering geo-fence 208 (e.g., on a way home, etc.) and/or pulling into a driveway, for example, mobile device 108 may (e.g., autonomously, automatically, etc.) launch an e-mail or short message service (SMS) application or interface and may notify (e.g., via e-mail, SMS text message, etc.) another family member of a user's safe arrival. Herein, terms such as "launch," "launching," or "executing" may be used interchangeably and may refer to one or more processes by which pre-fetched or pre-loaded (e.g., into a cache, RAM, etc.) information in the form of computer-readable code and/or instructions may be programmatically executed on a special purpose computing platform, for example, through any suitable sequence of operations to complete or otherwise perform a productive task or action for a user.

As mentioned above, in one particular implementation, launching an application and/or function may comprise a sequential process of pre-fetching or pre-loading computer-readable instructions for use with a particular application and/or function into a cache of mobile device 108 (e.g., from a remote server, main memory, etc.), for example, and executing such instructions without a user-initiated input or selection event, thus, activating such an application and/or function. For example, launching an application and/or function may include downloading and/or displaying a web page or bringing up an SMS interface on display 200, sending an e-mail, dialing a certain number, activating a game, etc. In some implementations, mobile device 108 may pre-fetch or pre-load instructions for an application and/or function into a local cache, RAM, etc. (e.g., without launching), for example, such that the application is running (e.g., in the background, via TSR program, etc.) on the device when it is accessed by a user, thus, making the application available with minimal delays, if a user chooses to launch it (e.g., via pressing a touch screen or button, activating gesture, etc.). However, these are merely examples relating to launching of an application and/or function, and claimed subject matter is not limited in scope in these respects.

As a way of illustration, upon user's entering geo-fence 208 (e.g., satisfying a condition), such as the inside area of a particular home, room, etc., for example, mobile device 108 may pre-fetch information via accessing one or more pre-defined URLs associated with news agencies or web-based newspaper services of interest (e.g., CNN, The Washington Post, The Wall Street Journal, etc.) and may download such web pages without any attentional demands by such a user, as previously discussed. In this particular example, a user may configure mobile device 108 to refresh and/or update (e.g., pre-fetch via re-accessing URLs, download, etc.) such web pages at any pre-defined time intervals (e.g., every 15 minutes, etc.), for example, while mobile device 108 is inside geo-fence 208 and/or within a certain distance from geo-area centroid 210. Such a technique may allow for immediate or otherwise more efficient access to relatively fresh or current news without requiring a user to continually maintain the context of the user-device interaction. Of course, this is merely an example and is not intended to limit claimed subject matter.

In some implementations, mobile device 108 may be configured to pre-fetch and/or bring up on display 200 an updated traffic report (e.g., via a traffic status map, etc.) upon user's exiting geo-fence 208 (e.g., on the way to work, school, etc.) and/or user's reaching a certain pre-defined distance from geo-area centroid 210, for example, to help such a user anticipate and/or avoid traffic congestions. Optionally or alternatively, such a report may be pre-fetched, downloaded, etc. by mobile device 108 at a selected or pre-defined time(s) of the day, although claimed subject matter is not limited in this respect.

As mentioned above, a location-aware and/or tracking unit (e.g., an SPS unit, etc.) may have a significant or otherwise substantial workload during operation, which may account for a major part of the total power consumption of a mobile device. Accordingly, in certain implementations, mobile device 108 may employ one or more processes or methods that may reduce the amount of power (e.g., battery, etc.) consumed, for example, in the course of applying a geo-fencing technique, as one possible illustration. Such a method may increase utility and/or overall efficiency of a mobile device, for example, via selective, incremental, and/or otherwise intelligent employment of such a location-aware and/or tracking unit. For example, instead of actively monitoring or tracking wireless signals in operational (e.g., full-power, full-observability, etc.) mode, such a location-aware unit may function in a low-power or low-observability mode and may attempt to determine an initial estimate of a location by periodically broadcasting wireless signals requesting responses from one or more nearby terrestrial communication systems that may include, for example, base transceiver stations 104 of FIG. 1.

As a way of illustration, mobile device 108 may be capable of determining or estimating its initial location based, at least in part, on measurements of ranges to one or more base stations 104. Such measurements of ranges may be based, at least in part, on time differences associated with wireless signals periodically broadcasted to and received from serving base station 104, strength of such signals, and/or round trip times of signals transmitted between mobile device 108 and such a station. Optionally or alternatively, mobile device 108 may attempt to periodically acquire (e.g., without broadcasting, etc.) location information signals, for example, from ground-based transmitters 106 (e.g., pseudolites, femtocells, etc.) in a respective coverage area, as previously discussed. Such an initial estimate of a location may be represented, for example, by a center of a coverage area of a serving transmitter 106, serving base station 104, some known or default geo-location (e.g., provided by a carrier, etc.), or some other location associated with a serving communication system, though claimed subject matter is not so limited.

Upon detecting a potential change(s) in estimated proximity of mobile device 108 with respect to geo-fence 208 and/or geo-area centroid 210, for example, mobile device 108 may initiate one or more processes so as to change an operating mode (e.g., power-up, etc.) of a location-aware and/or tracking unit to facilitate more precise or accurate location detection. As a way of illustration, a location-aware and/or tracking unit of mobile device 108 hosting a special purpose application (e.g., a navigation application, location manager, etc.) may function in a low-power or low-observability mode and may periodically (e.g., every 10 minutes, 5 minutes, etc.) obtain a message with initial estimates of a location from one or more base transceiver stations 104, transmitters 106, etc. Such a message may include, for example, latitude and longitude values with respect to mobile device 108 using a location of a nearest serving base station or transmitter as an approximation, as previously mentioned. Upon detecting that mobile device 108 is within a certain pre-defined (e.g., by a user, provider, etc.) distance from geo-fence 208 and/or geo-area centroid 210, a location-aware and/or tracking unit may initiate acquiring location information messages with shorter time intervals (e.g., every 1 minute, 30 seconds, etc.) and/or may power up to a full-power or full-observability mode or otherwise commence active tracking of mobile device 108, for example. As such, in one particular implementation, mobile device 108 may be "handed off" from ground-based assisted stations to actively process wireless signals from SVs 102, for example, to obtain a more precise determination of its location. Such a method(s) may potentially decrease overall power consumption of mobile device 108 by reducing unnecessary power-demanding functions (e.g., increased receiver power, etc.) while still maintaining sufficient functionality to support one or more processes associated, for example, with a location detection and/or tracking of mobile device 108. Of course, this is just an example relating to a power-saving technique or method illustrated in the course of applying a geo-fencing technique to which claimed subject matter is not limited. These and other location-tracking and/or location-aware techniques or methods are known and are not described here in greater detail.

As previously mentioned, mobile device 108 may be capable of facilitating or otherwise supporting one or more velocity estimation techniques based, at least in part, on processing one or more wireless signals (e.g., from an SPS, etc.) and/or signals received from one or more associated sensors. An example implementation of a mobile device comprising special purpose programmed circuitry including sensors capable of facilitating or otherwise supporting such velocity estimation techniques will be described in greater detail below with reference to FIG. 6. As discussed above, in the course of a contextual user-device interaction, a user may select, manage, or otherwise manipulate visual content, for example, via a touch-sensitive display and/or screen supported by a GUI of a special purpose computing platform associated with a mobile device. In certain implementations, a GUI may comprise an adaptive GUI that is enabled (e.g., by a user, service provider, etc.) and/or capable of dynamically customizing its layout and/or content based, at least in part, on particular needs or preferences of a user and/or a usage context associated with particular mobile settings or environments. It should be appreciated that adaptive GUI(s) may also be enabled utilizing one or more learning models of user behavior patterns (e.g., trained, etc.), although claimed subject matter is not limited in this respect.

Figure 3:
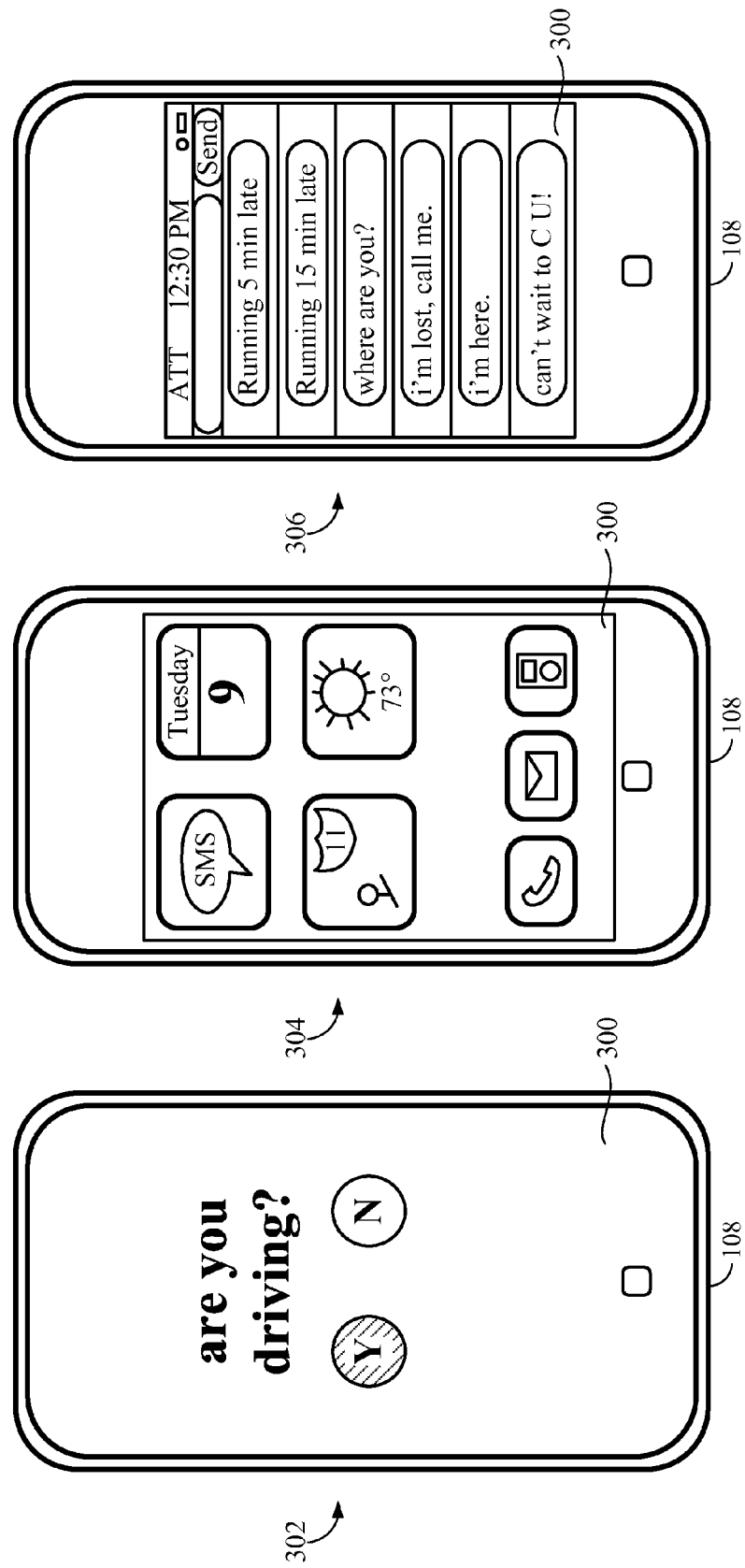

FIG. 3 illustrates various representations of a user display 300 and an associated adaptive GUI of mobile device 108, which is realized here as a location-aware smart telephone, according to an example implementation. Here, for example, a host location-aware application or other software may detect a change in velocity (e.g., increase/decrease in speed, change in direction, etc.) of mobile device 108 based, at least in part, on acquired velocity estimation signals from SVs 102, though claimed subject matter is not so limited. As one example, an increase in speed, the threshold(s) of which may be configured by a user, may prompt mobile device 108 to ask a user (e.g., via an application window, voice communication, etc.) whether such a change is attributed to a user's driving, as illustrated by arrow 302.

Upon an affirmative response from a user (e.g., via a touch screen, button, voice command, etc.), an adaptive GUI may dynamically customize its layout and/or content so as to emphasize, make visible, and/or rearrange applications and/or functions (e.g., via icons, tabs, etc.) that a user may use (e.g., pre-defined, etc.) in the context of driving (e.g., traffic reports, navigation, emergency contacts, etc.), as indicated generally at 304, with unnecessary applications and/or functions (e.g., games, camera, etc.) de-emphasized and/or removed. It should be noted that an adaptive GUI may be capable of dynamically changing the size of icons, screen buttons, font, etc. based, at least in part, on the rate of speed (e.g., the higher the speed, the larger the icons, etc.), thus, making mobile device 108 easier to operate, for example, in the context of driving, as mentioned above. Optionally or alternatively, the sizes of such icons, buttons, etc. may be pre-defined by a user, service provider, manufacturer, or the like. Of course, these are merely a few examples, and claimed subject matter is not so limited. Such techniques may allow for a safer and/or more efficient communication by avoiding or reducing distractions and/or lag times that may be associated with "hunting" for the correct information in fast-paced and/or attention-demanding mobile settings or environments (e.g., driving a car, bicycle, etc.).

In an implementation, a detected change in velocity (e.g., speed, etc.), for example, exceeding a certain pre-determined or pre-defined (e.g., by a user, etc.) threshold may initiate pre-fetching and subsequent launching of a text messaging application or interface, such as, for example, an SMS interface 306. As illustrated, mobile device 108 may then display pre-stored SMS phrases or messages, which may also help a user to avoid or eliminate distracting activity (e.g., texting, etc.) in the context of driving, as another example among many possible. Of course, various other implementations of adaptive GUIs are possible, and it is not intended to limit claimed subject matter to a particular implementation.

Following the above discussion, upon receipt of a negative response from a user with respect to a user's driving, for example, an adaptive GUI may further inquire (via a display, voice communication, etc.) whether an increase in speed is attributable to a user being on a plane, train, bus, etc. and/or may dynamically customize its layout and/or content based, at least in part, on a user's response. For example, mobile device 108 may display certain pre-defined applications when a user's response indicates that a user is traveling by plane and may display different applications when a user is on a train. Of course, this is just one non-limiting example. Optionally or alternatively, such a layout and/or content may be dynamically customized based, at least in part, on a speed of travel without making such an inquiry to a user, for example. It should be appreciated that one or more adaptive GUI techniques may be implemented based, at least in part, on processing signals received from one or more inertial sensors, such as, for example, accelerometers, gyroscopes, etc. that may be integrated into or otherwise supported by mobile device 108.

In one particular implementation, a detected change in velocity, such as a rate of speed of mobile device 108, for example, falling below a certain pre-determined or pre-defined (e.g., by a user, etc.) threshold observed within a certain time period may be recognized as a condition that initiates a pre-fetching and/or obtaining information without a contextual user-device interaction. For example, mobile device 108 may "shave seconds" (e.g., via pre-fetching, etc.) and/or may start downloading Twitter feeds, while a user comes to a stop (e.g., at a red light, stop sign, etc.) after driving at a speed above a threshold for a certain period of time (e.g., on a freeway, etc.). Here, such a condition may be detected, for example, by a location-aware and/or tracking unit determining speed via processing wireless signals associated with an SPS or, optionally or alternatively, by an accelerometer detecting deceleration of mobile device 108. Of course, such a description relating to "shaving seconds" via use of location-aware and/or tracking units and/or sensors is merely an example, and claimed subject matter is not so limited.

In certain example implementations, mobile device 108 may be capable of detecting a condition for initiating a particular action via processing signals received from one or more inertial sensors, such as one or more accelerometers that may be used to sense the direction of gravity to provide, for example, a measure of orientation or tilt (e.g., roll and pitch) and/or any other linear or angular motion experienced by mobile device 108. Typically, although not necessarily, an accelerometer may observe, sense, and/or measure a motion with reference to one, two, and/or three linear directions, often referenced in three-dimensional Cartesian coordinate space as axes or dimensions X, Y, and Z. Optionally or alternatively, an accelerometer may also provide measurements of magnitude of acceleration, for example. In one particular implementation, mobile device 108 may include a gyroscope, for example, to measure the rotation (e.g., about X, Y, and/or Z dimensions) or yaw, sometimes referred to as azimuth or heading.

For purposes of explanation, a three-dimensional (3D) accelerometer may sense, and/or provide measurements to indicate a motion in three-dimensional space along X, Y, and Z axes and/or may observe the direction of gravity to estimate roll and pitch. A one-dimensional (1D) accelerometer may sense and/or provide measurements to indicate linear motion along an X dimension, and a two-dimensional (2D) accelerometer may sense and/or provide measurements to indicate linear motion in a plane along both X and Y dimensions, for example. Accelerometers may provide measurements in terms of acceleration (e.g., in SI units representing distance per units of time squared, such as, e.g., [m/sec$^2$]), velocity (e.g., in SI units representing distance per units of time, such as, e.g., [m/sec]), or distance (e.g., in SI units representing distance, such as, e.g., [m]). Optionally or alternatively, a non-Cartesian coordinate system may be used, such as a coordinate system aligned with a body of a mobile device. In some implementations, a coordinate system may define dimensions that are mutually orthogonal.

It should be appreciated that there may be no single type of accelerometer which mobile device 108 may utilize or employ. For example, mobile device 108 may utilize a single 3D accelerometer or may employ a 3D accelerometer that may comprise a 2D accelerometer combined with a 1D accelerometer. Optionally or alternatively, mobile device 108 may employ three 1D accelerometers for X, Y, and Z dimensions, though claimed subject matter is not limited in scope in this respect. Accelerometers may be available from a variety of manufacturers, such as, for example, InvenSense, Inc., Analog Devices, Inc., Northrup Grumman, Inc., Kionix, Inc. Despite a possible diversity in quality, grade, performance, etc., employing accelerometers that are reasonably consistent across multiple product lines is a desirable goal.

In certain implementations, mobile device 108 may include ambient environment sensors, such as an ambient light detector, a proximity range sensor, a thermometer, a barometric pressure sensor (e.g., for altitude determination, etc.), or the like to facilitate or support pre-fetching and/or obtaining information based, at least in part, on processing signals received from such sensors, as previously mentioned. For example, an ambient light detector may measure an increase in luminous intensity of the ambient light to control display and/or touch screen backlighting so as to enhance visibility depending on environment or surroundings. For purposes of explanation, an ambient light detector may include, for example, a photodiode array or arrays to convert ambient light into current. Output analog signals may be digitized (e.g., via an analog-to-digital converter, etc.) to allow measurements in terms of illuminance (e.g., for light incident on a surface) and/or luminous emittance (e.g., for light emitted from a surface) in counts of [lux] in SI photometry units.

A proximity sensor may detect a presence of nearby objects, for example, without physical contact and may be implemented as an infrared (IR) emitter-receiver pair placed closely together on mobile device 108, though claimed subject matter is not so limited. Typically, although not necessarily, such a proximity sensor may emit (e.g., via a light emitting diode (LED), etc.) a beam of IR light and a reflected light (e.g., from a nearby object) may be converted into current and digitized (e.g., to allow for a measurement activity, etc.). A proximity sensor may be utilized to turn off a display (e.g., to conserve battery power, etc.), for example, and/or deactivate a touch screen so as to avoid unwanted input (e.g., via touches by ear, etc.) if a mobile device is brought near a face or ear during a call. Ambient environment sensors are known and need not be described here in greater detail. Such sensors may be available from a variety of manufacturers including, for example, Intersil Americas, Inc., Texas Advanced Optoelectronic Solutions, Inc., Avago Technologies Ltd, etc.

Certain implementations of mobile device 108 may also include one or more piezo sensors, such as, for example, piezo strips, screens, pads, etc. facilitating an output signal by generating an electric potential or current in response to applied mechanical pressure (e.g., touching, etc.). Such piezo sensors may be placed on one or more sides, corners, or other surfaces of mobile device 108, though claimed subject matter is not limited in these respects. Piezo sensors may be used to detect a pressure applied by a human hand, for example, by recognizing a "wrap," "grasp," "squeeze," etc. gesture sufficient to infer that a mobile device is being picked up by a user and/or held by a human hand and was not touched accidentally. Here, for example, DT series piezo sensors, available from Measurement Specialties, Inc., may be employed, though claimed subject matter is not so limited. Various other touch sensory technologies (e.g., capacitive sensing, resistive sensing, etc.) may also be utilized in and/or by mobile device 108 without limiting the scope of claimed subject matter. For example, mobile device 108 may include one or more capacitive proximity sensors placed on one or more surfaces of the mobile device to be utilized as a gesture input device(s) inferring and/or predicting a user-device interaction, just to illustrate one possible implementation. For purposes of explanation, a capacitive proximity sensor may detect a presence of an object (e.g., a finger(s), etc.) without physical contact by creating an electric field and measuring a change in capacitance (e.g., attenuations suffered by the electric field) when such an object is brought sufficiently close to the sensor. It should be appreciated that such one or more capacitive proximity sensors may be positioned on mobile device 108 strategically (e.g., on the opposite sides, etc.) so as to sense or detect finger(s) proximity to the sensor(s) and/or recognize a "grasp" gesture before a user actually touches mobile device 108, thus, inferring or predicting a user-device interaction. One or more capacitive sensor values or measurements may also be used for one or more signal correlation techniques, as will be described in greater detail below. Capacitive proximity sensors may be available from various manufacturers, such as, for example, Freescale Semiconductor, Inc., Capacitek, Inc., just to name a few.

It should be appreciated that in some example implementations mobile device 108 may include other types of sensors beyond sensors listed herein, which signals may be processed in some manner and/or used to detect a particular condition of the device. For example, signals from a built-in digital camera that track optical motion of an object in the image viewer may be processed to detect such a condition, just to illustrate another possible implementation. It should also be noted that the above sensors, as well as other possible sensors not listed, may be utilized individually or in combination with other sensors, depending on a particular implementation of mobile device 108.

In some implementations, one or more signal processing techniques may be used to correlate signals from sensors with a particular pre-defined signal pattern or signature indicating a substantial or significant likelihood that a mobile device is being put into use (e.g., removed from a pocket, picked up from a table, etc.), as previously mentioned. Such technique(s) may help to eliminate or reduce false positives and/or negatives in initiating a performance of a particular action by mobile device 108. For example, a signal measurement of acceleration followed by a signal measurement of luminous activity or brightness observed within a certain time period by an ambient light detector may comprise such a signal pattern or signature, though claimed subject matter is not so limited. As a way of illustration, a user, having mobile device 108 in a pocket or purse (e.g., in a dark area), for example, may reach towards the device in an attempt to put it into use in a context of a particular user-device interaction, such as making a call, checking an e-mail, accessing a web site, etc. An accelerometer may sense an upward motion that may be sufficiently continuous in one direction so as to exceed a pre-defined or pre-determined (e.g., by a user, service provider, manufacturer, etc.) threshold value. An accelerometer activity may be measured and, if followed by an increase in luminous activity exceeding a threshold value, for example, mobile device 108 may recognize such a correlation of a signal pattern or signature and may detect or infer that a particular condition has occurred.

By way of example but not limitation, an accelerometer activity that continues, for example, 200 milliseconds (ms)

and that followed by an increase in brightness, for example, from 0 or near 0 to 300 lux may be recognized by mobile device 108 as a signal pattern or signature. In certain implementations, a sufficiently continuous upward motion (e.g., for 200 ms) of mobile device 108 followed by an increase in brightness (e.g., up to 300 lux) in conjunction with a continued accelerometer activity (e.g., to verify that gravity is pulling down on (−Z) axis) for a total of 800 ms, for example, may also comprise a signal pattern or signature indicating a substantial or significant likelihood that mobile device 108 is being removed from a pocket or purse. Optionally or alternatively, mobile device 108 may be configured such that any accelerometer activity that continues for 100 ms before and for another 100 ms after an increase in brightness from 0 or near 0 to 300 lux, for example, may be recognized by mobile device 108 as a signal pattern or signature indicating that the device is coming out of a pocket or purse to be put into use. In some implementations, a pressure output from one or more piezo sensors detecting a "squeeze" gesture of a user, for example, followed by a signal from a microphone representative of the cloth being dragged over a microphone port for a certain time period (e.g., for 200 ms), for example, may also comprise a signal pattern or signature. In one particular implementation, a signal representative of a change in capacitance (e.g., in a formed electric field) detected, for example, by two capacitive proximity sensors disposed on opposite sides of mobile device 108 indicating that a user is about to grasp or pick up the mobile device with a hand (e.g., not inadvertent contact, etc.) followed by an accelerometer activity in conjunction with an increase in brightness, as described above, may be recognized as a signal pattern or signature. Of course, such descriptions of signal patterns or signatures as well as the above threshold values are merely examples to which claimed subject matter is not limited. Based, at least in part, on such one or more signal patterns or signatures, mobile device 108 may detect or infer a particular condition and may initiate a particular action, as previously discussed. For example, mobile device 108 may pre-fetch or pre-load (e.g., locally in a cache, etc.) and/or download certain text-based posts or "tweets" while a user unlocks mobile device 108 and accesses the TweetDeck or other like application. Such a technique may eliminate or reduce undesirable delays so as to "shave seconds" from the contextual user-device interaction, for example.

It should be appreciated that one or more power-managing techniques may also be utilized, for example, during a correlation of signals. For example, a power state of a sensor in an idle or sleep-mode state may be changed in response to signals received from a sensor in a low-power or low-observability state while signals from these sensors are being correlated with a particular pattern or signature. In one particular implementation, an ambient light detector, for example, may be powered up in response to signals received from one or more accelerometers performing a measurement activity. Of course, this is just merely an example relating to power-managing techniques that could be implemented during a correlation of signals, and claimed subject matter is not limited in this regard.

In one implementation, a measure of tilt or orientation (e.g., in a vertical plane, horizontal plane, etc.) of mobile device 108, for example, in conjunction with one or more ambient environment sensing techniques may be used to "shave seconds" from user-device interactions in a context of answering a call, sending an e-mail, SMS text or message, or other like network-based or network-supported communications. By way of example but not limitation, a user may configure mobile device 108 such that placing the device in a pocket top down (e.g., vertically, substantially vertically, etc.) with display 200 facing such a user (e.g., towards the leg, chest, etc.) may prompt the device to read incoming SMS text or e-mail messages out loud (e.g., via a voice output using assistive text-to-speech (TTS) or related technology). In another example, placing mobile device 108 on a surface, the user's leg, etc. (e.g., horizontally, substantially horizontally, etc.) with display 200 facing away from such a surface, the leg, etc. may facilitate sending a reply by mobile device 108 to an incoming SMS message. For example, such a reply message may be like "I am driving right now, will get back to you later." In still another example, mobile device 108 may be configured (by a user, service provider, manufacturer, etc.) such that if placed in a pocket top up, then an incoming SMS text or e-mail message may prompt the device to dial the telephone number associated with the sender of such a message. Subsequently, and without additional action and/or attentional demands by the user, the user may be communicatively connected with and may be able to talk to the sender (e.g., over a Bluetooth™ set, car speakers, and/or related technology, etc.). Such an implementation may provide an advantage including an ability of a user to stay connected and/or be more productive during a commute while eliminating or reducing distracting activity (e.g., texting, reading e-mails, etc.) while driving. Of course, such a technique and its benefits is merely an example, and claimed subject matter is not so limited. Here, the above conditions of mobile device 108 may be detected, for example, by an accelerometer via measurements of gravity forces on (+Z) or (−Z) axis (e.g., if a user is standing) or (−X) axis (e.g., if a user is sitting), and/or potentially an ambient light detector performing respective measurement activities. Whether a person is standing or sitting may be potentially determined via one or more techniques related to a posture tremor detection utilizing a linear accelerometer, for example. It should be appreciated that the above conditions of mobile device 108 may be detected, for example, without the use of an ambient light detector.

In a particular implementation, mobile device 108 may utilize one or more techniques to pre-fetch information for use by an automatic call application, such as an outbound dialer, for example, and to automatically launch such an application (e.g., dial a pre-defined number, etc.) based, at least in part, on an informative gesture(s) of a user. As will be seen, such an informative gesture may include, for example, one or more wrist and/or hand gestures, such as tilt gestures, directional gestures, and/or other gestures, personalized (e.g., created by a user, etc.) or otherwise, along a single or multiple axes, though claimed subject matter is not limited in this respect. These techniques may provide a benefit to or convenience for a user, for example, by automating a manual dialing procedure and serving as a hotkey(s) that may "shave seconds" from the time it takes to navigate through a contact list of persons to call.

One potential example of such a technique may be performed in two parts. In a first part, a first condition of mobile device 108 may be detected, for example, via correlation of signals with a pre-defined signal pattern or signature indicating that the device is coming out of a pocket to be put into use, as discussed above. In a second part, an informative gesture of a user may be evaluated and a second condition that initiates a performance of a particular action of mobile device 108 may be detected. It should be appreciated that a first and a second condition may be required to occur in a particular order and/or with applicable relations to each other (e.g., during a certain time window or interval, etc.) to initiate a particular action of mobile device 108, though claimed subject matter is not so limited. As previously mentioned, detection of a first condition may, for example, initiate pre-fetching information for use by a call application in a cache of mobile device 108, and detection of a second condition may initiate a particular action of the device, such as automatically dialing a pre-defined number. Of course, this is just an example to which claimed subject matter is not limited. Here, a first and a second condition of mobile device 108 may be detected, for example, by a three-dimensional (3D) accelerometer and/or potentially a gyroscope performing respective measurement activities.

In this illustrated example, subsequent to being removed from a pocket or purse (e.g., with a pre-loaded call application, etc.), mobile device 108 may be brought up by a user to an ear, for example, and may allow such a user to employ one or more informative tilt gestures, each defining a particular number to dial. By way of example but not limitation, mobile device 108 may be capable of being trained (e.g., by a user, etc.) so as to recognize one or more levels of wrist-based tilt gestures or motions. Such gestures may partially or substantially comprise a personalized gesture vocabulary or library and may be stored in memory of mobile device 108, for example, wherein each distinct tilt gesture may correspond to a particular outbound number.

In one particular implementation, a user may train mobile device 108 such that naturally bringing the device up and holding it next to an ear for a certain period of time (e.g., 200 ms, etc.) in an angle typical while talking into a phone (e.g., with a microphone against a mouth) may be recognized by the device as Tilt Level 1 or Gesture 1, for example, which may initiate an automatic dialing a pre-defined number of a user's spouse. Likewise, naturally bringing mobile device 108 to an ear, then tilting the device up until its microphone is next to a user's nose (e.g., while a speaker is still against the ear), and back down until a microphone is again next to the mouth may be recognized, for example, as Tilt Level 2 or Gesture 2 triggering a call to a user's friend. Similarly, an automatic dialing to a user's co-worker, for example, may require wider angular positions of an up-and-down tilt of mobile device 108 (e.g., up to an eyebrow and back, etc.), which may be trained and subsequently recognized as Tilt Level 3 or Gesture 3. Of course, such descriptions of various tilt levels, gestures, dialed numbers or parties, etc. are merely illustrative examples, and claimed subject matter is not limited in these respects. It should be appreciated that any other suitable gestures, personalized or otherwise, beyond gestures mentioned herein (e.g., an air circle or figure eight, waiving up or down, etc.) including but not limited to finger gestures (e.g., sign language, etc.) may be employed by a user and/or recognized by mobile device 108.

As previously mentioned, a user may train mobile device 108 to recognize one or more informative gestures by holding mobile device 108 in a hand, for example, and repeating (e.g., inputting, etc.) each gesture a certain number of times during a recording or initialization stage. Such a process may generate one or more gesture templates that may be stored in memory of mobile device 108, as mentioned above. A user may associate a particular gesture with a certain outbound number, for example, via a GUI by pressing or touching one or more selectable icons or buttons corresponding to an outbound number and/or identity of such a gesture, just to illustrate one possible implementation. In operative use, mobile device 108 may match properties (e.g., acceleration peaks, time series of acceleration values along X, Y, and/or Z axes, etc.) of an informative gesture of a user against properties of one or more templates of a gesture vocabulary and may perform an action (e.g., dial a number, etc.) based, at least in part, on how well properties of an informative gesture match properties of a particular template, for example.

It should be appreciated that personalized gestures may be trained with a certain number of repetitions or, optionally or alternatively, may only require a single training sample. In addition, a gesture vocabulary may not be personalized or may comprise any combination of personalized and non-personalized gesture templates. Non-personalized gesture template(s) may be supplied, partially or substantially, to and/or pre-stored on mobile device 108 by a service provider, device manufacturer, third party marketer, etc, for example.

Figure 4:
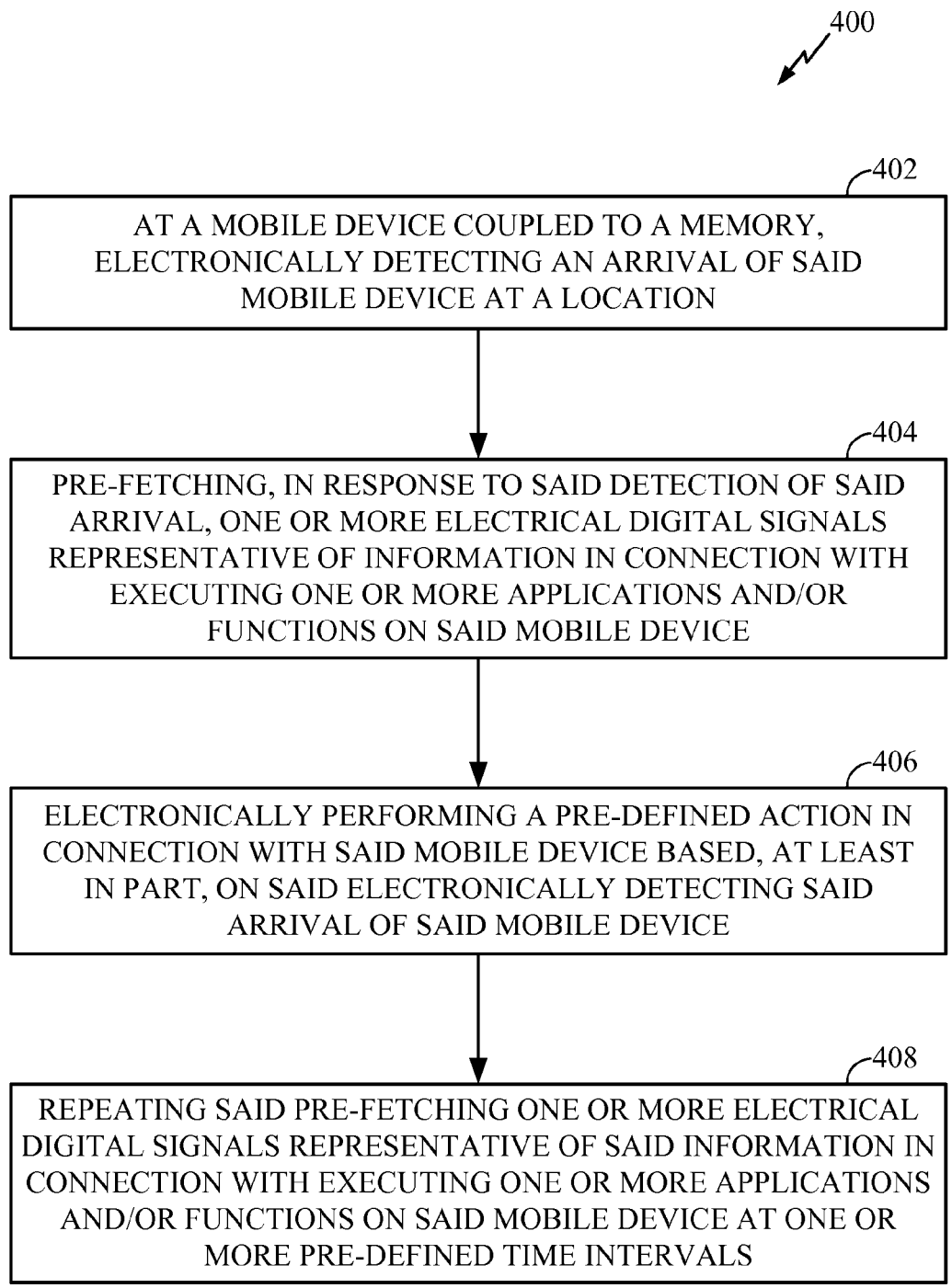
FIG. 4 is a flow diagram illustrating an example process for pre-fetching information based on a gesture of a user and/or location of a mobile device.

FIG. 4 is a flow diagram illustrating an example process 400 for performing pre-fetching and/or obtaining information based, at least in part, on a gesture of a user and/or location of a mobile device according to an implementation. The example process may begin with a user defining a geo-fence via a suitable application and/or function by manually drawing a virtual boundary line on a digital map, as one possible example. A user may configure or define one or more parameters of interest that may be recognized, for example, as triggering event(s) associated with such a geo-fence. Such parameters may include, for example, a particular action to be taken by a mobile device, timing of such an action, repeating a particular action, time intervals with respect to a particular action to be repeated, etc., just to name a few examples.

At operation 402, an arrival of a mobile device at a location may be detected, for example, based, at least in part, on monitoring one or more wireless signals associated with an SPS with respect to a mobile device and a particular location, as previously mentioned. For example, such an arrival may be detected upon a mobile device crossing a pre-defined geo-fence, nearing a geo-point or geo-area centroid, etc. With regard to operation 404, one or more electrical digital signals representative of information in connection with executing one or more applications and/or functions associated with a mobile device may be pre-fetched and/or obtained, for example, in response to detecting such an arrival. Pre-fetching and/or obtaining information may include, for example, pre-loading or reserving (e.g., in a cache, etc.) information for use by and/or with one or more applications and/or functions, such as an e-mail application, SMS application, outbound call dialing application, etc., just to name a few examples. At operation 406, a process may electronically perform a pre-defined action in connection with a mobile device based, at least in part, on receiving one or more signals representative of an arrival of a mobile device at a particular location. Such an action may include, for example, launching an application and/or function, such as an e-mail or text messaging application, web-based application, bringing up on a display a contact list or menu, dialing a certain number, sending an electronic message, etc. With regard to operation 408, pre-fetching of information represented by one or more digital signals may be repeated, for example, at one or more pre-defined time intervals. For example, a mobile device may pre-fetch such information at specified time intervals so as to update or refresh a particular web page(s) while the device is within a perimeter of a geo-fence or within a certain distance from a geo-point or geo-area centroid. A location of a geo-fence and/or other related information may be stored, for example, in memory of a mobile device as one or more digital signals.

Figure 5:
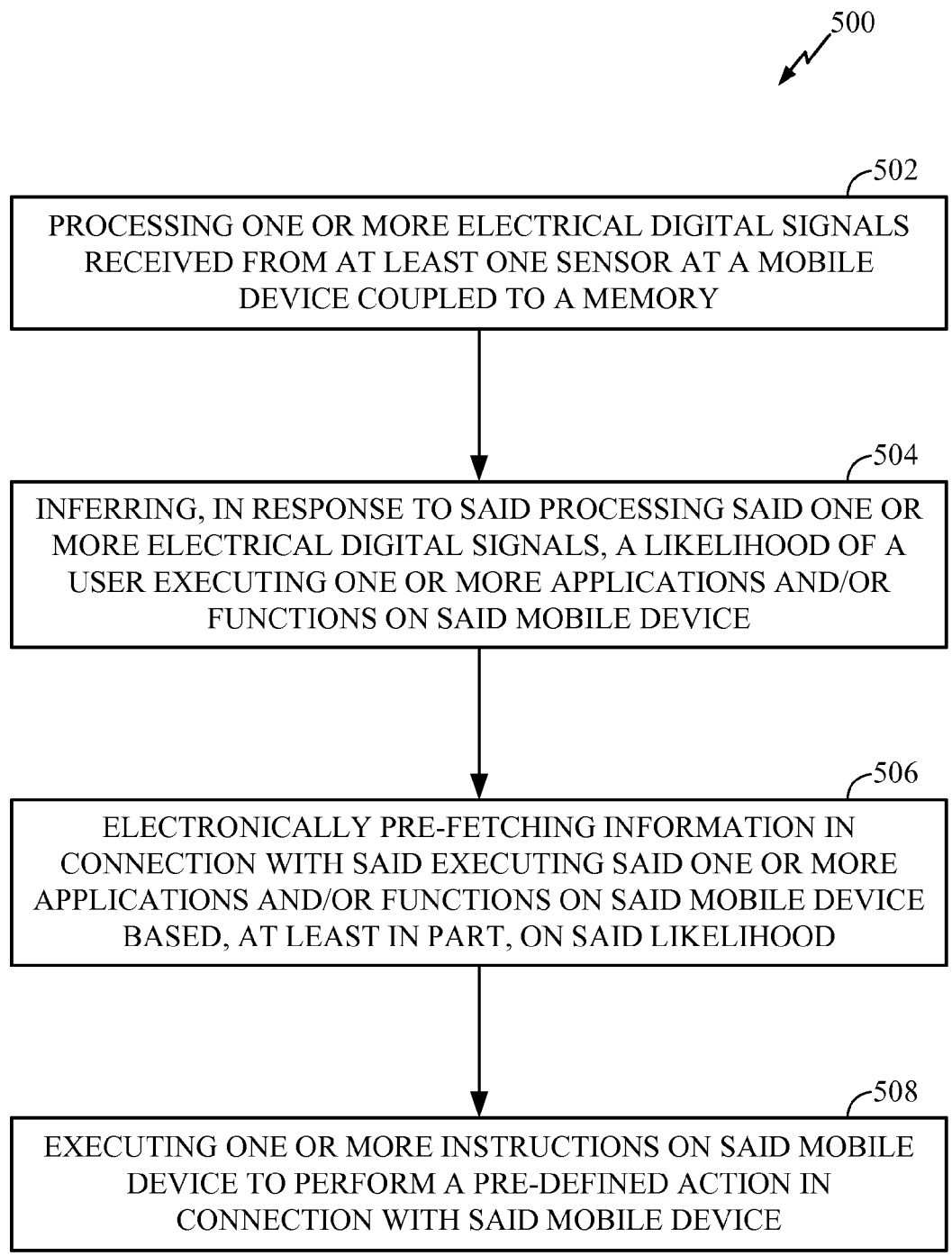
FIG. 5 is a flow diagram illustrating another example process for pre-fetching information based on a gesture of a user and/or location of a mobile device.

FIG. 5 is a flow diagram illustrating another example process 500 for performing pre-fetching and/or obtaining information based, at least in part, on a gesture of a user and/or location of a mobile device according to an implementation. Example process 500 may be initiated by one or more sensors that may be integrated into or otherwise supported by a mobile device and may generate one or more signals representative of sensor-based and/or sensor-supported measurements with respect to various states of a mobile device. For example, at operation 502, one or more signals may be received from at least one sensor and may be processed in some manner at a mobile device, as previously described. At operation 504, having processed such one or more signals, a mobile device may infer, for example, a likelihood of a user executing one or more applications and/or functions on the device. As one example, a mobile device may infer or predict a likelihood of a user's attempt to remove a mobile device from a pocket, purse, holder, etc. and to put said mobile device into use, such as to make a call, check or answer e-mails, launch a particular application and/or function, access a particular web page, etc. In addition, signals from sensors may be correlated with a pre-determined signal pattern or signature indicating a likelihood of a user's attempt to put a mobile device into use in the context of a particular user-device interaction, as mentioned above. Also, sensors may be deployed incrementally and/or intelligently so as to possibly reduce power consumption and/or increase utility of a mobile device. For example, a power state or mode of one or more sensors may be changed from a sleep-mode state to an operational state in response to a signal(s) received from a sensor in a low-observability state.

Having inferred a likelihood of a user executing one or more applications and/or functions on a mobile device, at operation 506, information in connection with such executing one or more applications and/or functions may be electronically pre-fetched or pre-loaded into the mobile device (e.g., in a local cache, RAM, etc.). In one implementation, such pre-fetching may be initiated through accessing, for example, a pre-defined URL or like resource indicator associated with the Web through a suitable wireless communications network. With regard to operation 508, a process may further execute one or more instructions to perform a pre-defined action in connection with a mobile device, such as, for example, launching an SMS or e-mail messaging interface, sending an electronic message, dialing a pre-defined number, displaying a contact list on a display of a mobile device, etc.

FIG. 6 is a schematic diagram illustrating an example computing environment 600 that may include one or more networks and/or devices configurable to partially or substantially implement and/or support one or more processes for pre-fetching and/or obtaining information based, at least in part, on a gesture of a user and/or location of a mobile device, in accordance with an example implementation.

Here, computing environment 600 may include, for example, various computing and/or communication resources capable of providing location information with regard to a mobile device 602 based, at least in part, on one or more wireless signals 604 associated with a particular SPS. Mobile device 602 may also be adapted to communicate with one or more resources within a wireless communications network 606, for example, over one or more wireless communication links 608, as previously mentioned. Although not shown, optionally or alternatively, there may be additional devices, mobile or otherwise, communicatively coupled to network 606 to facilitate or otherwise support one or more processes associated with operating environment 600.

As illustrated, in certain example implementations, mobile device 602 may include a location-aware and/or tracking unit realized herein as a satellite positioning system unit (SPSU) 610, though claimed subject matter is not so limited. SPSU 610 may comprise, for example, at least one receiver capable of receiving and/or processing one or more wireless signals (e.g., via a front-end circuit, back-end processor, etc.). In certain example implementations, one or more processing units 612 may be operatively coupled to SPSU 610 and may be enabled to acquire and/or provide all or part of location information (e.g., existing, updated, etc.) in support of one or more processes in response to specific instructions, which may be stored in memory 614, for example, along with one or more location information, threshold parameters, and/or other like information.

Memory 614 may represent any information storage medium. For example, memory 614 may include a primary memory 616 and a secondary memory 618. Primary memory 616 may include, for example, a random access memory, read only memory, etc. While illustrated in this example as being separate from processing unit(s) 612, it should be appreciated that all or part of primary memory 616 may be provided within or otherwise co-located/coupled with processing unit(s) 612.

Secondary memory 618 may include, for example, the same or similar type of memory as primary memory and/or one or more information storage devices or systems, such as, for example, a disk drive, an optical disc drive, a tape drive, a solid state memory drive, etc. In certain implementations, secondary memory 618 may be operatively receptive of, or otherwise enabled to be coupled to, a computer-readable medium 620. Computer-readable medium 620 may include, for example, any medium that can store and/or provide access to information, code and/or instructions (e.g., an article of manufacture, etc.) for one or more devices associated with operating environment 600.

Computer-readable medium 620 may be provided and/or accessed by processing unit(s) 612, for example. As such, in certain example implementations, the methods and/or apparatuses may take the form, in whole or part, of a computer-readable medium that may include computer implementable instructions stored thereon, which, if executed by at least one processing unit or other like circuitry, may enable processing unit(s) 612 and/or the other like circuitry to perform all or portions of a location determination processes, sensor-based and/or sensor-supported measurements (e.g., acceleration, deceleration, velocity, tilt, rotation, etc.) or any like processes to facilitate or otherwise support pre-fetching information based, at least in part, on a gesture of a user or location of mobile device 602. In certain example implementations, processing unit(s) 612 may be adapted to perform and/or support other functions, such as communication, etc.

Processing unit(s) 612 may be implemented in hardware or a combination of hardware and software. Processing unit(s) 612 may be representative of one or more circuits configurable to perform at least a portion of information computing technique or process. By way of example but not limitation, processing unit(s) 612 may include one or more processors, controllers, microprocessors, microcontrollers, application specific integrated circuits, digital signal processors, programmable logic devices, field programmable gate arrays, and the like, or any combination thereof.

Mobile device 602 may include various components and/or circuitry, such as, for example, a power source 622, an accelerometer 624, an ambient light sensor or detector 626, a piezo sensor 628, a proximity sensor 630, and/or various other sensors 632, to facilitate or otherwise support one or more processes associated with operating environment 600, as previously described. For example, such sensors may provide analog and/or digital signals to processing unit(s) 612. Although not shown, it should be noted that mobile device 602 may include an analog-to-digital converter (ADC) for digitizing analog signals from one or more sensors. Optionally or alternatively, such sensors may include a designated (e.g., an internal, etc.) ADC(s) to digitize respective output signals, although claimed subject matter is not so limited. Power source 622 may provide power to some or all of the components and/or circuitry of mobile device 602. Power source 622 may be a portable power source, such as a battery, for example, or may comprise a fixed power source, such as an outlet (e.g. in a house, electric charging station, car, etc.). It should be appreciated that power source 622 may be integrated into (e.g., built-in, etc.) or otherwise supported by (e.g., stand-alone, etc.) mobile device 602.

Mobile device 602 may include one or more connections 634 (e.g., buses, lines, conductors, optic fibers, etc.) to operatively couple various circuits together, and a user interface 636 (e.g., display, touch screen, keypad, buttons, knobs, microphone, speaker, trackball, data port, etc.) to receive user input, facilitate or support sensor-related signal measurements (e.g., from microphone, etc.), and/or provide information to a user. Mobile device 602 may further include a communication interface 638 (e.g., wireless transceiver, modem, antenna, etc.) to allow for communication with one or more other devices or systems over one or more wireless communication links such as, for example, one or more communication links 110 of FIG. 1.

Methodologies described herein may be implemented by various means depending upon applications according to particular features and/or examples. For example, such methodologies may be implemented in hardware, firmware, software, discrete/fixed logic circuitry, any combination thereof, and so forth. In a hardware and/or logic circuitry implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices or units designed to perform the functions described herein, and/or combinations thereof, just to name a few examples.

For a firmware and/or software implementation, the methodologies may be implemented with modules (e.g., procedures, functions, etc.) having instructions that perform the functions described herein. Any machine readable medium tangibly embodying instructions may be used in implementing the methodologies described herein. For example, software codes may be stored in a memory and executed by a processor. Memory may be implemented within the processor or external to the processor. As used herein the term "memory" refers to any type of long term, short term, volatile, nonvolatile, or other memory and is not to be limited to any particular type of memory or number of memories, or type of media upon which memory is stored. In at least some implementations, one or more portions of the herein described storage media may store signals representative of data and/or information as expressed by a particular state of the storage media. For example, an electronic signal representative of data and/or information may be "stored" in a portion of the storage media (e.g., memory) by affecting or changing the state of such portions of the storage media to represent data and/or information as binary information (e.g., ones and zeros). As such, in a particular implementation, such a change of state of the portion of the storage media to store a signal representative of data and/or information constitutes a transformation of storage media to a different state or thing.

In one or more example implementations, the functions described may be implemented in hardware, software, firmware, discrete/fixed logic circuitry, some combination thereof, and so forth. If implemented in software, the functions may be stored on a physical computer-readable medium as one or more instructions or code. Computer-readable media include physical computer storage media. A storage medium may be any available physical medium that can be accessed by a computer. By way of example, and not limitation, such computer-readable media can comprise RAM, ROM, EEPROM, CD-ROM or other optical disc storage, magnetic disk storage or other magnetic storage devices, or any other medium that can be used to store desired program code in the form of instructions or data structures and that can be accessed by a computer and/or processor thereof. Disk and disc, as used herein, includes compact disc (CD), laser disc, optical disc, digital versatile disc (DVD), floppy disk and blue-ray disc where disks usually reproduce data magnetically, while discs reproduce data optically with lasers.

According to certain example implementations, a mobile device may, for example, be enabled for use with various wireless communication networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may include an IEEE 802.11x network, and a WPAN may include a Bluetooth network, an IEEE 802.15x, for example.

Also, computer instructions/code may be transmitted via signals over physical transmission media from a transmitter to a receiver. For example, software may be transmitted from a website, server, or other remote source using a coaxial cable, fiber optic cable, twisted pair, digital subscriber line (DSL), or physical components of wireless technologies such as infrared, radio, and microwave. Combinations of the above should also be included within the scope of physical transmission media.

Some portions of this Detailed Description are presented in terms of algorithms or symbolic representations of operations on binary digital signals stored within a memory of a specific apparatus or special purpose computing device or platform. In the context of this particular Specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, considered to be a self-consistent sequence of operations or similar signal processing leading to a desired result. In this context, operations or processing involve physical manipulation of physical quantities. Typically, although not necessarily, such quantities may take the form of electrical and/or magnetic signals capable of being stored, transferred, combined, compared, or otherwise manipulated.

It has proven convenient at times, principally for reasons of common usage, to refer to such signals as bits, data, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, and/or magnetic quantities within memories, registers, or other information storage devices, transmission devices, or display devices of the special purpose computer or similar special purpose electronic computing device.

While certain example techniques have been described and shown herein using various methods and/or systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to particular examples disclosed, but that such claimed subject matter may also include all implementations falling within the scope of the appended claims, and equivalents thereof.

What is claimed is:

1. A method comprising:
    at a mobile device coupled to a memory, electronically detecting an arrival of said mobile device at a location by determining an estimate of a location of said mobile device and detecting that said estimated location is within a pre-defined geo-fenced area; and
    pre-fetching, from said memory and in response to said detection of said arrival, one or more electrical digital signals representative of information in connection with executing one or more applications and/or functions on said mobile device.

2. The method of claim 1, wherein said pre-defined geo-fenced area comprises a virtual boundary around a center point, a virtual boundary drawn by user, or a virtual boundary defined by a plurality of coordinate points.

3. The method of claim 1, wherein said electronically detecting said arrival further comprises:
    at said mobile device, electronically obtaining at least one of the following information: time of day information; day of week information; month information; year information; or any combination thereof; and
    electronically determining whether said electronically obtained information satisfies at least one of the following: pre-defined time of day information; pre-defined day of week information; pre-defined month information; pre-defined year information; or any combination thereof.

4. The method of claim 1, wherein said electronically detecting said arrival further comprises:
    electronically determining a rate of speed of said mobile device; and
    electronically determining whether said rate of speed corresponds to at least one of the following: a rate of speed falling below a pre-defined threshold; a rate of speed exceeding a pre-defined threshold; or a rate of speed being between a lower threshold and a higher threshold.

5. The method of claim 1, wherein said pre-defined geo-fenced area is user-configurable.

6. The method of claim 1, wherein said electronically detecting that said estimated location is within said pre-defined geo-fenced area comprises:
    electronically detecting that said estimated location is within a pre-defined distance from a geo-area centroid.

7. The method of claim 6, wherein said electronically detecting said arrival further comprises:
    electronically determining a rate of speed of said mobile device; and
    electronically determining whether said rate of speed corresponds to at least one of the following: a rate of speed falling below a pre-defined threshold; a rate of speed exceeding a pre-defined threshold; or a rate of speed being between a lower threshold and a higher threshold.

8. The method of claim 6, wherein said pre-defined distance from said geo-area centroid is user-configurable.

9. The method of claim 1, wherein said pre-fetching one or more electrical digital signals representative of information in connection with executing one or more applications and/or functions on said mobile device comprises pre-fetching one or more of the following: information for an e-mail application; information for a short messaging service (SMS) application; information for a call application; information representative of a contact list; or information located at a pre-defined universal resource locator (URL).

10. The method of claim 1, and further comprising:
    electronically performing a pre-defined action in connection with said mobile device based, at least in part, on said electronically detecting said arrival of said mobile device.

11. The method of claim 10, wherein said pre-defined action comprises at least one of the following: sending an electronic message; dialing a pre-defined number; accessing information associated with a pre-defined URL; downloading information associated with a pre-defined URL; displaying a contact list on a user display; displaying information associated with a pre-defined URL on a user display; or displaying a messaging interface on a user display.

12. The method of claim 10, wherein said pre-defined action is user-configurable.

13. The method of claim 1, and further comprising:
    repeating said pre-fetching one or more electrical digital signals representative of said information in connection with executing one or more applications and/or functions on said mobile device at one or more pre-defined time intervals.

14. The method of claim 13, wherein said one or more pre-defined time intervals are user-configurable.

15. The method of claim 1, and further comprising:
    storing one or more digital signals representative of information associated with said location in said memory.

16. The method of claim 1, and further comprising:
    changing a power state of one or more sensors in response to one or more signals detecting said arrival of said mobile device at said location.

17. The method of claim 16, wherein said changing a power state of one or more sensors comprises changing a power state of at least a location-aware and/or tracking unit supported by said mobile device from a low-power state to a full-observability state.

18. A method comprising:
processing one or more electrical digital signals received from at least one sensor at a mobile device coupled to a memory, the one or more electrical digital signals representing an informative gesture of a user;
inferring, in response to said processing said one or more electrical digital signals, a likelihood of a user executing one or more applications and/or functions on said mobile device; and
electronically pre-fetching information in connection with said executing said one or more applications and/or functions on said mobile device based, at least in part, on said likelihood.

19. The method of claim 18, wherein said electronically pre-fetching information comprises pre-fetching one or more electrical digital signals representative of at least one of the following: information for an e-mail application; information for a short messaging service (SMS) application; information for a call application; a contact list; or information located at a pre-defined universal resource locator (URL).

20. The method of claim 18, and further comprising:
executing one or more instructions on said mobile device to perform a pre-defined action in connection with said mobile device, wherein said pre-defined action comprises at least one of the following: sending an electronic message; dialing a pre-defined number; accessing information associated with a pre-defined URL; downloading information associated with a pre-defined URL; displaying a contact list on a user display; displaying information associated with a pre-defined URL on a user display; or displaying a messaging interface on a user display.

21. The method of claim 20, wherein said executing one or more instructions is performed without at least one of the following: a contextual user-device interaction; a user-initiated input; or a user-initiated selection event.

22. The method of claim 20, wherein said pre-defined action is user-configurable.

23. The method of claim 18, wherein said processing one or more electrical digital signals received from at least one sensor comprises at least one of the following: transitioning said mobile device to be in an operational state; or transitioning said at least one sensor to be in an operational state.

24. The method of claim 18, wherein said likelihood of a user executing one or more applications and/or functions on said mobile device comprises a likelihood of a user's attempt to put said mobile device into use.

25. The method of claim 18, wherein said processing said one or more electrical digital signals comprises correlating at least two of said electrical digital signals with a pre-defined signal pattern or signature.

26. The method of claim 18, and further comprising:
changing an appearance of a user interface associated with said mobile device based, at least in part, on a rate of speed detected by said mobile device at least meeting one or more pre-defined thresholds.

27. The method of claim 26, wherein said changing said appearance of said user interface comprises dynamically customizing at least one of the following: a layout of said user interface so as to emphasize some pre-defined applications and/or functions and de-emphasize other pre-defined applications and/or functions; or a content of said user interface so as to make visible some pre-defined applications and/or functions and remove other pre-defined applications and/or functions.

28. The method of claim 26, wherein said one or more pre-defined thresholds are user-configurable.

29. The method of claim 18, and further comprising:
electronically determining a rate of speed of said mobile device; and
performing, responsive to one or more signals indicative of a lower rate of speed at least meeting a pre-defined threshold, at least one of the following: sending an electronic message; dialing a pre-defined number; accessing information associated with a pre-defined URL; downloading information associated with a pre-defined URL; displaying a contact list on a user display; displaying information associated with a pre-defined URL on a user display; or displaying a messaging interface on a user display.

30. The method of claim 29, wherein said rate of speed is maintained above said lower rate of speed for at least a pre-determined period of time.

31. The method of claim 18, and further comprising:
changing a power state of a first sensor supported by said mobile device from a sleep-mode state to an operational state in response to a signal received from a second sensor in a low-observability state also supported by said mobile device.

32. The method of claim 18, and further comprising:
generating, with said mobile device, at least one gesture template based, at least in part, on an input gesture representative of at least one training sample; and
storing said at least one gesture template as one or more digital signals in said memory of said mobile device as part of a gesture vocabulary.

33. The method of claim 32, and further comprising:
receiving the one or more electrical digital signals representing the informative gesture of the user; and
identifying, upon accessing said gesture vocabulary from said memory, one or more digital signals representing said at least one gesture template as matching said informative gesture of said user.

34. The method of claim 33, wherein said identifying said at least one gesture template as matching said informative gesture of said user is based, at least in part, on matching properties identifiable in one or more digital signals representing said at least one gesture template and properties identifiable in one or more digital signals representing said informative gesture of said user.

35. The method of claim 33, and further comprising:
electronically dialing a pre-defined number based, at least in part, on said identifying said at least one gesture template.

36. The method of claim 32, wherein said gesture vocabulary comprises at least one of the following: a personalized gesture template; a non-personalized gesture template; or any combination thereof.

37. The method of claim 18, and further comprising:
detecting an orientation of said mobile device based, at least in part, on one or more signals received from an accelerometer and/or an ambient light detector, said accelerometer and/or said ambient light detector being supported by said mobile device; and
performing, in response to said detecting said orientation, in connection with said mobile device at least one of the following: reading an incoming electronic message out loud; sending a pre-defined electronic message in response to an incoming electronic message; dialing a pre-defined number associated with a sender of an incoming electronic message; or any combination thereof.

38. The method of claim 37, wherein said detecting said orientation of said mobile device comprises at least one of the following: detecting an orientation of said mobile device with respect to a vertical plane; or detecting an orientation of said mobile device with respect to a horizontal plane.

39. A method comprising:
at a mobile device coupled to a memory, electronically detecting a departure of said mobile device from a location by determining an estimate of a location of said mobile device and detecting that said estimated location is within a pre-defined geo-fenced area; and
pre-fetching, from said memory and in response to said detection of said departure, one or more electrical digital signals representative of information in connection with executing one or more applications and/or functions on said mobile device.

40. The method of claim 39, wherein said electronically detecting said departure further comprises:
at said mobile device, electronically obtaining at least one of the following information: time of day information; day of week information; month information; year information; or any combination thereof; and
electronically determining whether said electronically obtained information satisfies at least one of the following: pre-defined time of day information; pre-defined day of week information; pre-defined month information; pre-defined year information; or any combination thereof.

41. The method of claim 39, wherein said electronically detecting said departure further comprises:
electronically determining a rate of speed of said mobile device; and
electronically determining whether said rate of speed corresponds to at least one of the following: a rate of speed falling below a pre-defined threshold; a rate of speed exceeding a pre-defined threshold; or a rate of speed being between a lower threshold and a higher threshold.

42. The method of claim 39, and further comprising:
electronically performing a pre-defined action in connection with said mobile device based, at least in part, on said electronically detecting said departure of said mobile device.

43. An apparatus comprising:
a mobile device comprising a computing platform coupled to a memory and configured to:
electronically detect an arrival of said mobile device at a location by determining an estimate of a location of said mobile device and detecting that said estimated location is within a pre-defined geo-fenced area; and
pre-fetch, from said memory and in response to said detection of said arrival, one or more electrical digital signals representative of information in connection with executing one or more applications and/or functions on said mobile device.

44. The apparatus of claim 43, further comprising:
a receiver configured to at least monitor one or more wireless signals from at least one wireless network.

45. The apparatus of claim 43, wherein pre-fetching one or more electrical digital signals representative of information in connection with executing one or more applications and/or functions on said mobile device comprises pre-fetching one or more of the following: information for an e-mail application; information for a short messaging service (SMS) application; information for a call application; information representative of a contact list; or information located at a pre-defined universal resource locator (URL).

46. The apparatus of claim 43, wherein said computing platform is further configured to repeat said pre-fetching one or more electrical digital signals representative of said information in connection with executing one or more applications and/or functions on said mobile device at one or more pre-defined time intervals.

47. The apparatus of claim 46, wherein said one or more pre-defined time intervals are user-configurable.

48. An apparatus comprising:
means for processing one or more electrical digital signals received from at least one sensor at a mobile device coupled to a memory, the one or more electrical digital signals representing an informative gesture of a user;
means for inferring, in response to said processing said one or more electrical digital signals, a likelihood of a user executing one or more applications and/or functions on said mobile device; and
means for electronically pre-fetching information in connection with said executing said one or more applications and/or functions on said mobile device based, at least in part, on said likelihood.

49. The apparatus of claim 48, wherein said means for processing said one or more electrical digital signals comprises means for correlating at least two of said electrical digital signals with a pre-defined signal pattern or signature.

50. The apparatus of claim 48, and further comprising:
means for changing a power state of a first sensor supported by said mobile device from a sleep-mode state to an operational state in response to a signal received from a second sensor in a low-observability state also supported by said mobile device.

51. The apparatus of claim 48, and further comprising:
means for changing an appearance of a user interface associated with said mobile device based, at least in part, on a rate of speed detected by said mobile device at least meeting one or more pre-defined thresholds.

52. The apparatus of claim 48, and further comprising:
means for generating, with said mobile device, at least one gesture template based, at least in part, on an input gesture representative of at least one training sample; and
means for storing said at least one gesture template as one or more digital signals in said memory of said mobile device as part of a gesture vocabulary.

53. The apparatus of claim 48, and further comprising:
means for receiving the one or more digital signals representing the informative gesture of the user; and
means for identifying, upon accessing said gesture vocabulary from said memory, one or more digital signals representing said at least one gesture template as matching said informative gesture of said user.

54. An article comprising:
a storage medium having instructions stored thereon executable by a special purpose computing platform to:
process one or more electrical digital signals received from at least one sensor at a mobile device coupled to a memory, the one or more electrical digital signals representing an informative gesture of a user;
infer, in response to executing instructions to process said one or more electrical digital signals, a likelihood of a user executing one or more applications and/or functions on said mobile device; and pre-fetch information in connection with said executing said one or more applications and/or functions on said mobile device based, at least in part, on said likelihood.

55. The article of claim 54, wherein said instructions to process one or more electrical digital signals received from at least one sensor comprises at least one of the following: instructions to transition said mobile device to be in an operational state; or instructions to transition said at least one sensor to be in an operational state.

56. The article of claim 54, wherein said instructions to process said one or more electrical digital signals comprises instructions to correlate at least two of said electrical digital signals with a pre-defined signal pattern or signature.

57. The article of claim 54, wherein said storage medium further includes instructions to:
   change an appearance of a user interface associated with said mobile device based, at least in part, on a rate of speed detected by said mobile device at least meeting one or more pre-defined thresholds.

58. The article of claim 54, wherein said storage medium further includes instructions to:
   change a power state of a first sensor supported by said mobile device from a sleep-mode state to an operational state in response to a signal received from a second sensor in a low-observability state also supported by said mobile device.

59. The article of claim 54, wherein said storage medium further includes instructions to:
   generate, with said mobile device, at least one gesture template based, at least in part, on an input gesture representative of at least one training sample; and
   store said at least one gesture template as one or more digital signals in said memory of said mobile device as part of a gesture vocabulary.

60. The article of claim 59, wherein said storage medium further includes instructions to:
   receive the one or more digital signals representing the informative gesture of the user; and
   identify, upon accessing said gesture vocabulary from said memory, one or more digital signals representing said at least one gesture template as matching said informative gesture of said user.

61. A mobile device, comprising:
   a memory means;
   means for detecting an arrival of said mobile device at a location by determining an estimate of a location of said mobile device and detecting that said estimated location is within a pre-defined geo-fenced area; and
   means for pre-fetching, from said memory means and in response to said detection of said arrival, one or more electrical digital signals representative of information in connection with executing one or more applications and/or functions on said mobile device.

62. A non-transitory computer-readable medium, comprising:
   at least one instruction for detecting an arrival of said mobile device at a location by determining an estimate of a location of said mobile device and detecting that said estimated location is within a pre-defined geo-fenced area; and
   at least one instruction for pre-fetching, from a memory of said mobile device and in response to said detection of said arrival, one or more electrical digital signals representative of information in connection with executing one or more applications and/or functions on said mobile device.

63. A non-transitory computer-readable medium, comprising:
   at least one instruction for processing one or more electrical digital signals received from at least one sensor at a mobile device coupled to a memory, the one or more electrical digital signals representing an informative gesture of a user;
   at least one instruction for inferring, in response to said processing said one or more electrical digital signals, a likelihood of a user executing one or more applications and/or functions on said mobile device; and
   at least one instruction for electronically pre-fetching information in connection with said executing said one or more applications and/or functions on said mobile device based, at least in part, on said likelihood.

* * * * *